(12) United States Patent
Matsumoto

(10) Patent No.: US 10,762,020 B2
(45) Date of Patent: Sep. 1, 2020

(54) BUS SYSTEM AND COMMUNICATION DEVICE

(71) Applicant: Sony Corporation, Tokyo (JP)

(72) Inventor: Hideyuki Matsumoto, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/764,980

(22) PCT Filed: Sep. 15, 2016

(86) PCT No.: PCT/JP2016/077275
§ 371 (c)(1),
(2) Date: Mar. 30, 2018

(87) PCT Pub. No.: WO2017/061247
PCT Pub. Date: Apr. 13, 2017

(65) Prior Publication Data
US 2018/0276165 A1 Sep. 27, 2018

(30) Foreign Application Priority Data
Oct. 9, 2015 (JP) .................................. 2015-201459

(51) Int. Cl.
*G06F 13/40* (2006.01)
*H04L 25/03* (2006.01)

(52) U.S. Cl.
CPC .......... *G06F 13/4027* (2013.01); *H04L 25/03* (2013.01); *H04L 25/03057* (2013.01);
(Continued)

(58) Field of Classification Search
None
See application file for complete search history.

(56) References Cited

U.S. PATENT DOCUMENTS 4,416,016 A * 11/1983 Iapicco ............... H04L 27/2331
329/310
5,268,712 A * 12/1993 Hilpert ..................... H03J 7/32
348/732
(Continued)

FOREIGN PATENT DOCUMENTS

JP 06-006798 A 1/1994
JP 10-084393 A 3/1998
(Continued)

OTHER PUBLICATIONS

Japanese Office Action dated Jun. 9, 2020 for corresponding Japanese Application No. 2017-544432.

*Primary Examiner* — Henry Tsai
*Assistant Examiner* — Christopher A Bartels
(74) *Attorney, Agent, or Firm* — Michael Best & Friedrich LLP

(57) ABSTRACT

A bus system according to the present disclosure includes: three or more devices that include one or a plurality of imaging devices, and transmit and receive a data signal in a time-division manner; and a bus to which the three or more devices are coupled and through which the data signal is transmitted. A first device of the three or more devices includes: an equalizer having a first operation mode in which a received signal is equalized with use of a coefficient set including one or a plurality of equalization coefficients, a storage unit that stores a plurality of the coefficient sets, and a communication controller that selects one of the plurality of the coefficient sets stored in the storage unit and causes the equalizer to operate in the first operation mode with use of the selected coefficient set.

16 Claims, 23 Drawing Sheets

(52) U.S. Cl.
CPC ............... *H04L 2025/03471* (2013.01); *H04L 2025/03566* (2013.01); *Y02D 10/14* (2018.01); *Y02D 10/151* (2018.01)

(56) References Cited

U.S. PATENT DOCUMENTS

| | | | | |
|---|---|---|---|---|
| 6,411,253 | B1* | 6/2002 | Cox | G01S 7/285 |
| | | | | 342/13 |
| 6,480,285 | B1* | 11/2002 | Hill | G01B 9/04 |
| | | | | 356/492 |
| 6,526,101 | B1* | 2/2003 | Patel | H03D 1/24 |
| | | | | 348/E5.108 |
| 6,983,009 | B2* | 1/2006 | Lomp | H04B 1/707 |
| | | | | 375/149 |
| 7,064,498 | B2* | 6/2006 | Dowling | A61N 5/0616 |
| | | | | 315/291 |
| 7,844,014 | B2* | 11/2010 | Keerthi | H03F 1/0222 |
| | | | | 375/285 |
| 2006/0008279 | A1* | 1/2006 | Chiang | H04B 10/6971 |
| | | | | 398/202 |
| 2007/0146721 | A1* | 6/2007 | Barcelos | G01M 11/335 |
| | | | | 356/477 |
| 2007/0237221 | A1* | 10/2007 | Hsu | H04N 19/61 |
| | | | | 375/240.03 |
| 2008/0050025 | A1* | 2/2008 | Bashyam | G06T 9/002 |
| | | | | 382/238 |
| 2012/0287141 | A1* | 11/2012 | Higgins | H04N 19/98 |
| | | | | 345/581 |
| 2013/0004179 | A1* | 1/2013 | Nielsen | H04B 3/50 |
| | | | | 398/115 |
| 2013/0198311 | A1* | 8/2013 | Tamir | G06F 15/167 |
| | | | | 709/212 |
| 2014/0098844 | A1* | 4/2014 | Mobin | H04B 1/40 |
| | | | | 375/219 |
| 2016/0134300 | A1* | 5/2016 | Wang | H03M 1/0854 |
| | | | | 341/172 |
| 2016/0373125 | A1* | 12/2016 | Pagnanelli | H03M 3/404 |
| 2017/0222753 | A1* | 8/2017 | Angelopoulos | H04L 1/0043 |

FOREIGN PATENT DOCUMENTS

| | | |
|---|---|---|
| JP | 2005-525729 A | 8/2005 |
| JP | 2006-262395 A | 9/2006 |
| JP | 2012-124593 A | 6/2012 |
| JP | 2015-073278 A | 4/2015 |
| WO | 2015/052879 A1 | 4/2015 |

* cited by examiner

[ FIG. 1 ]
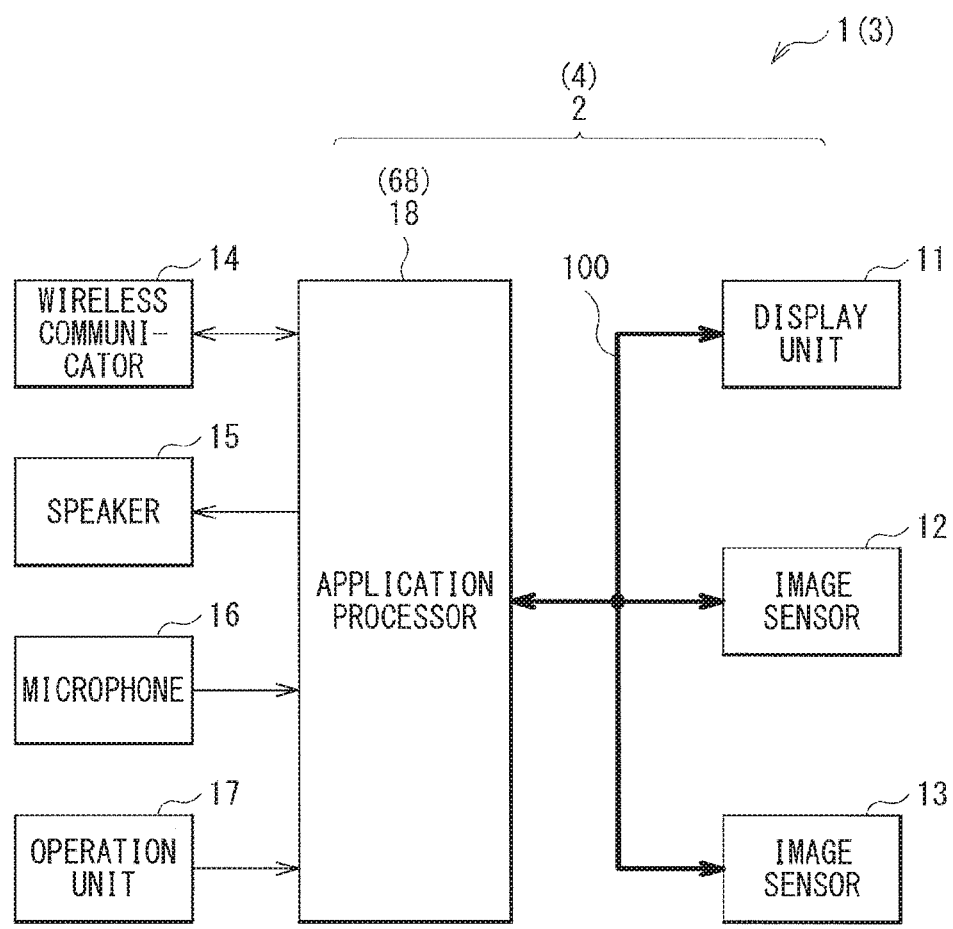

[ FIG. 2 ]
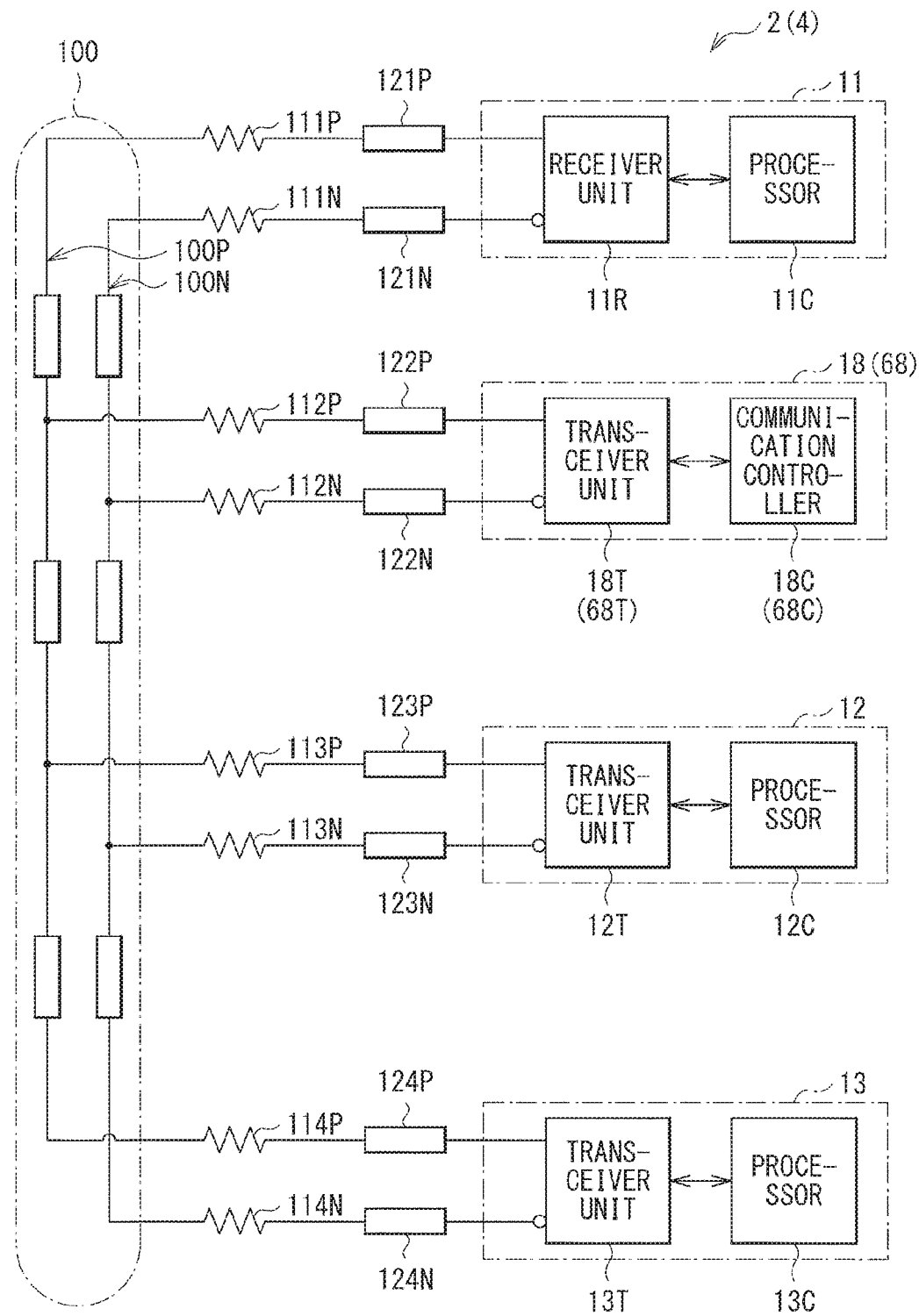

[ FIG. 3 ]
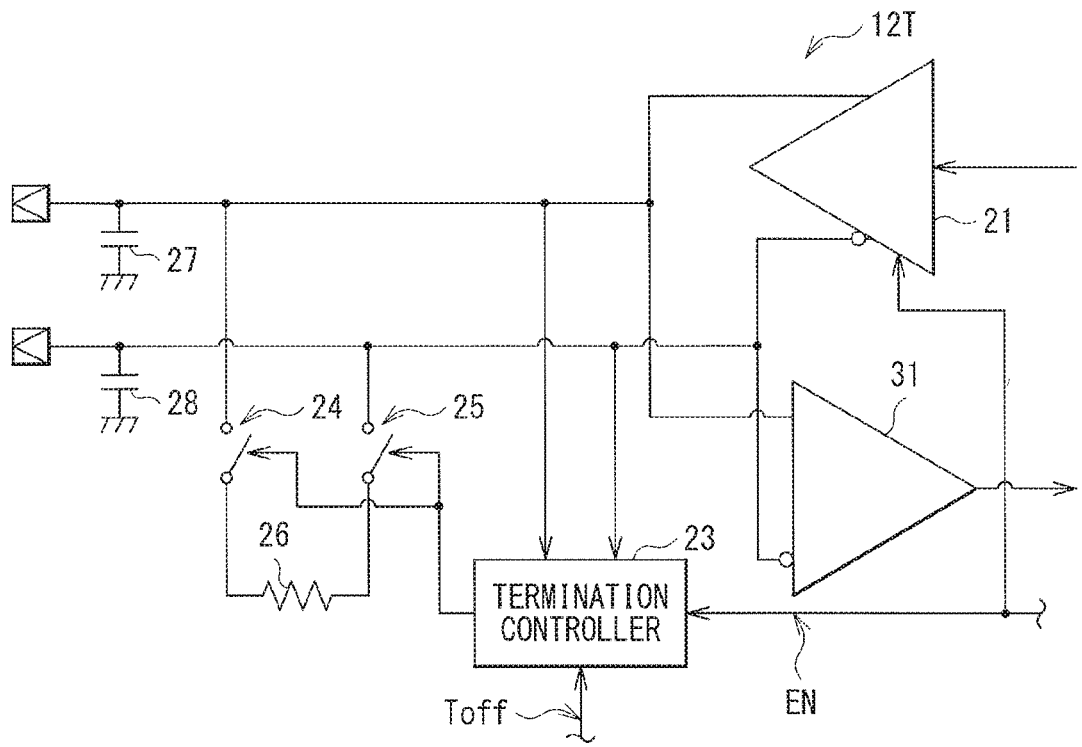
[ FIG. 4 ]
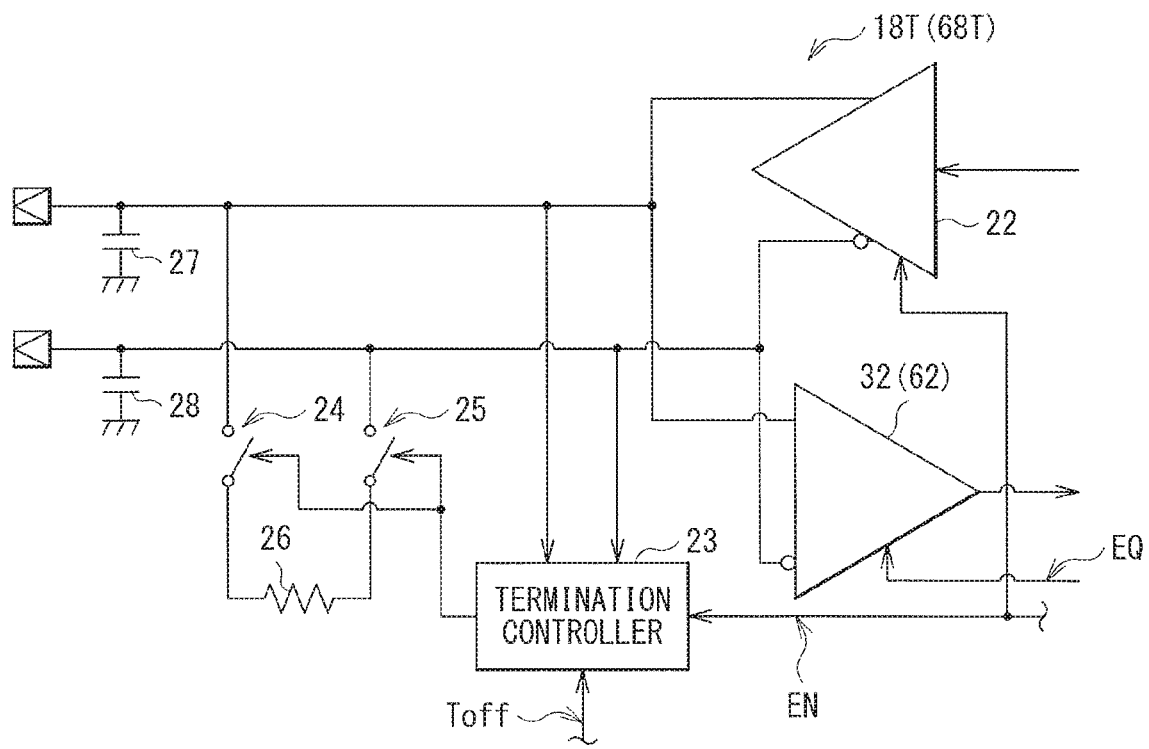

[FIG. 5]
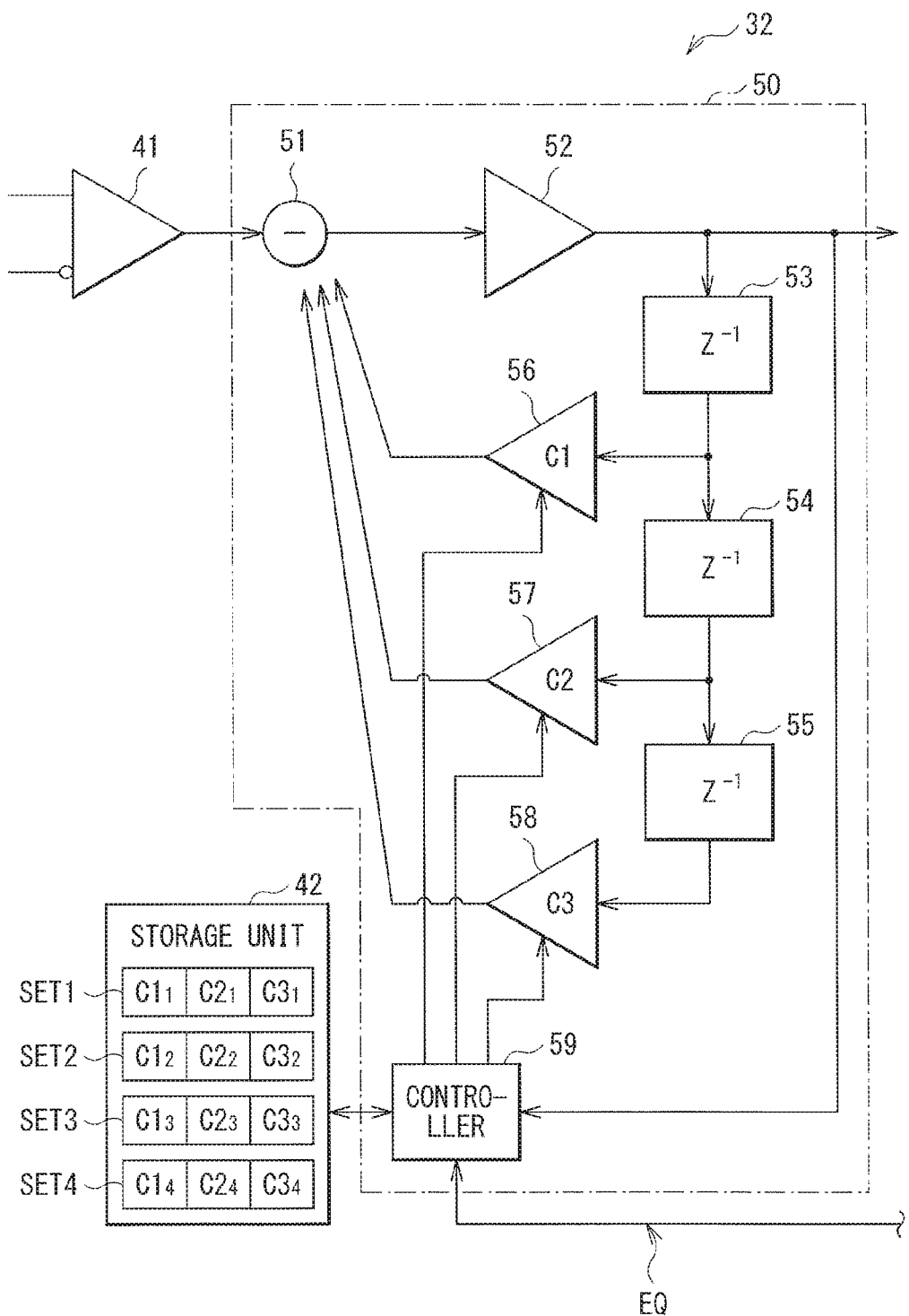

[ FIG. 6 ]
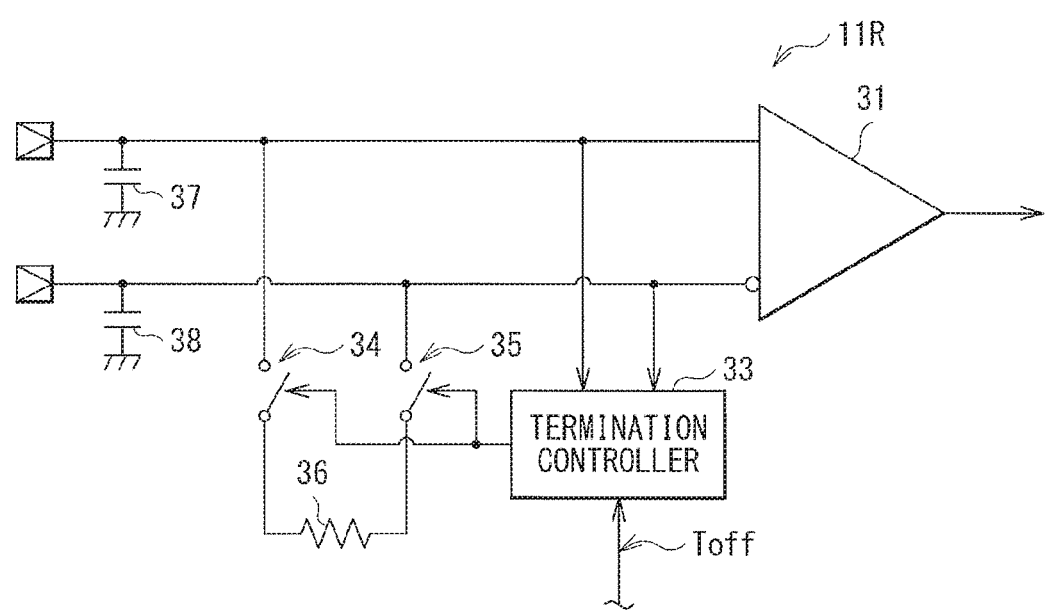

[FIG. 7]
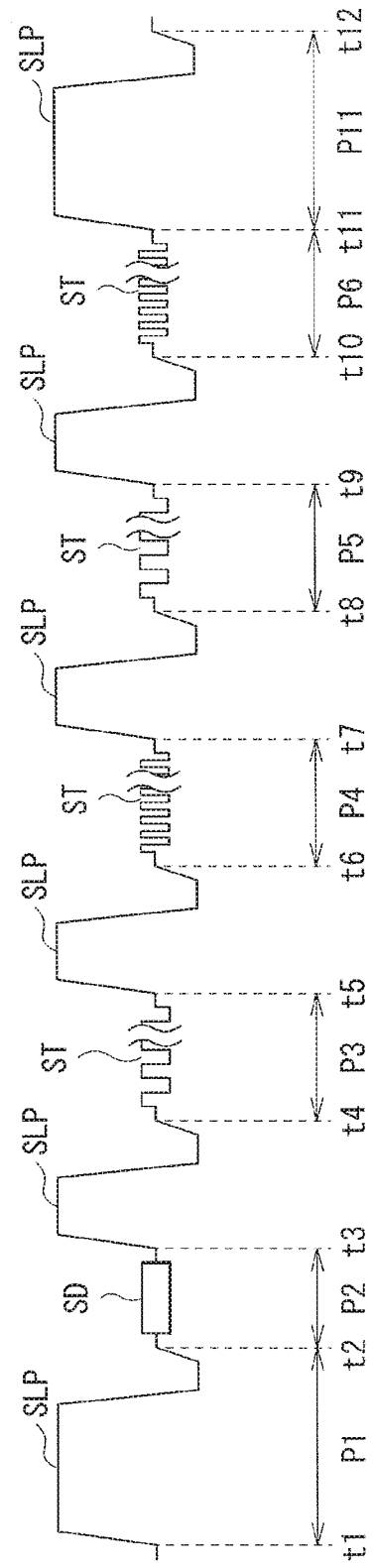

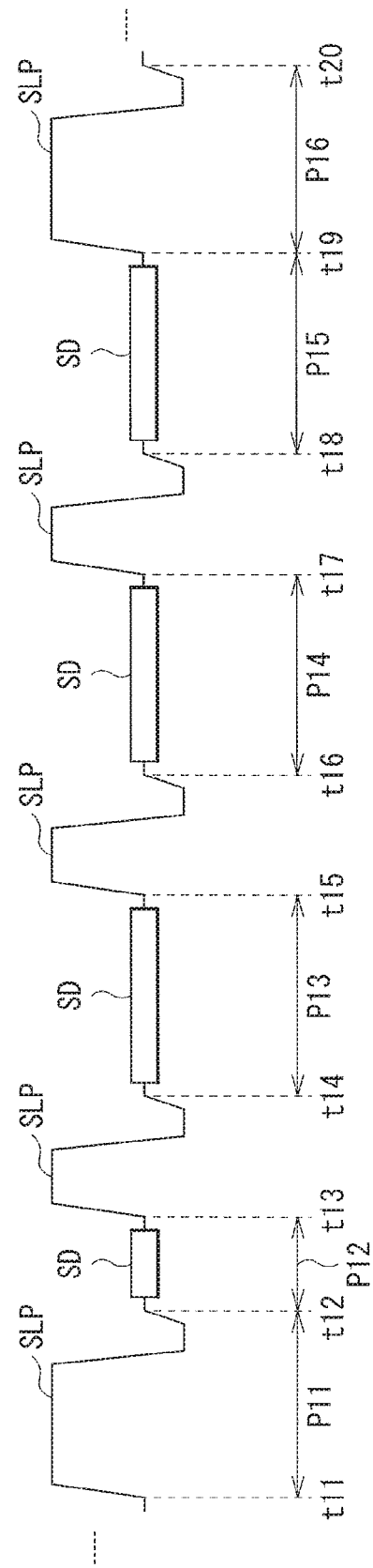
[FIG. 8]

[ FIG. 9A ]
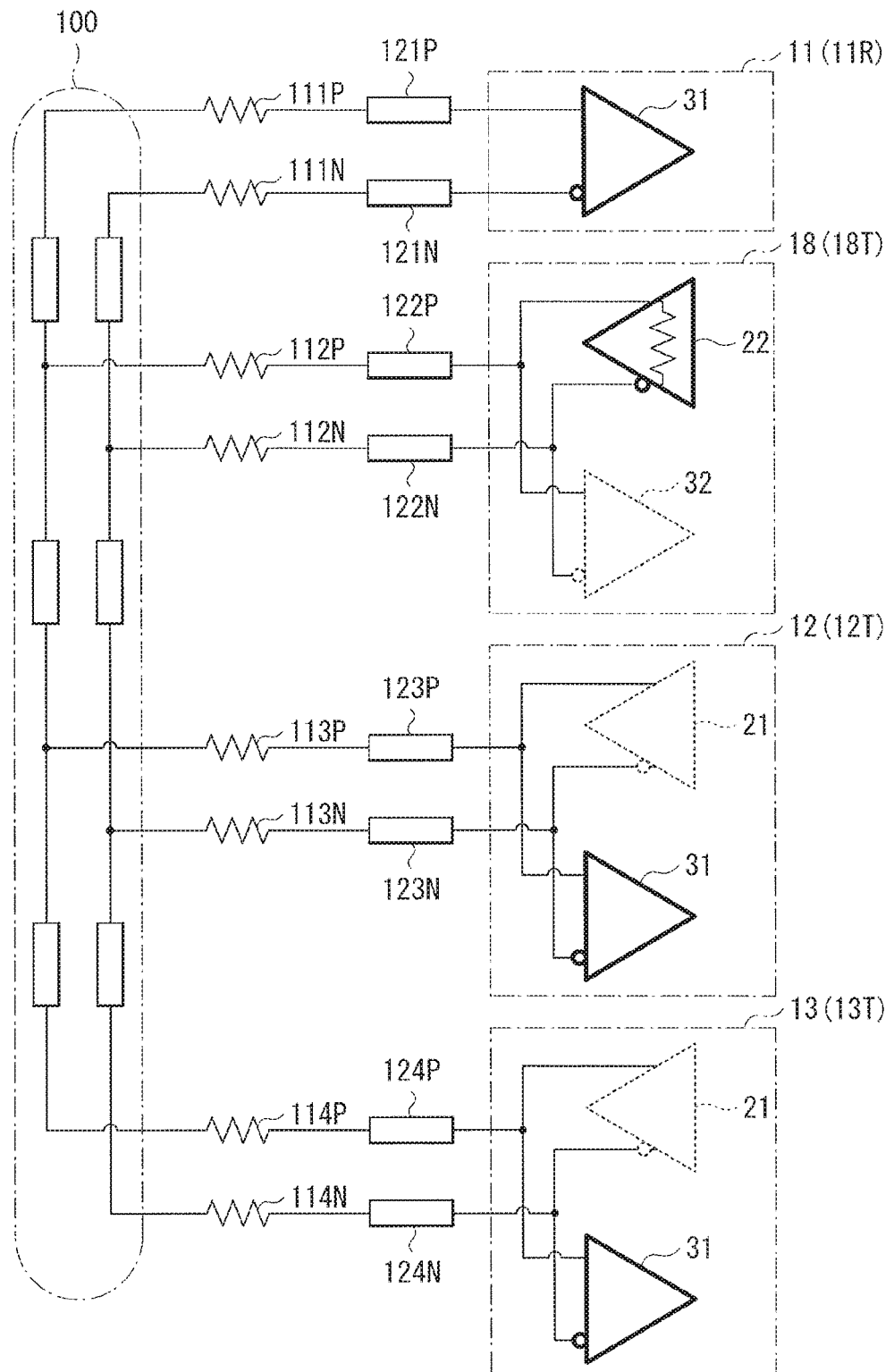

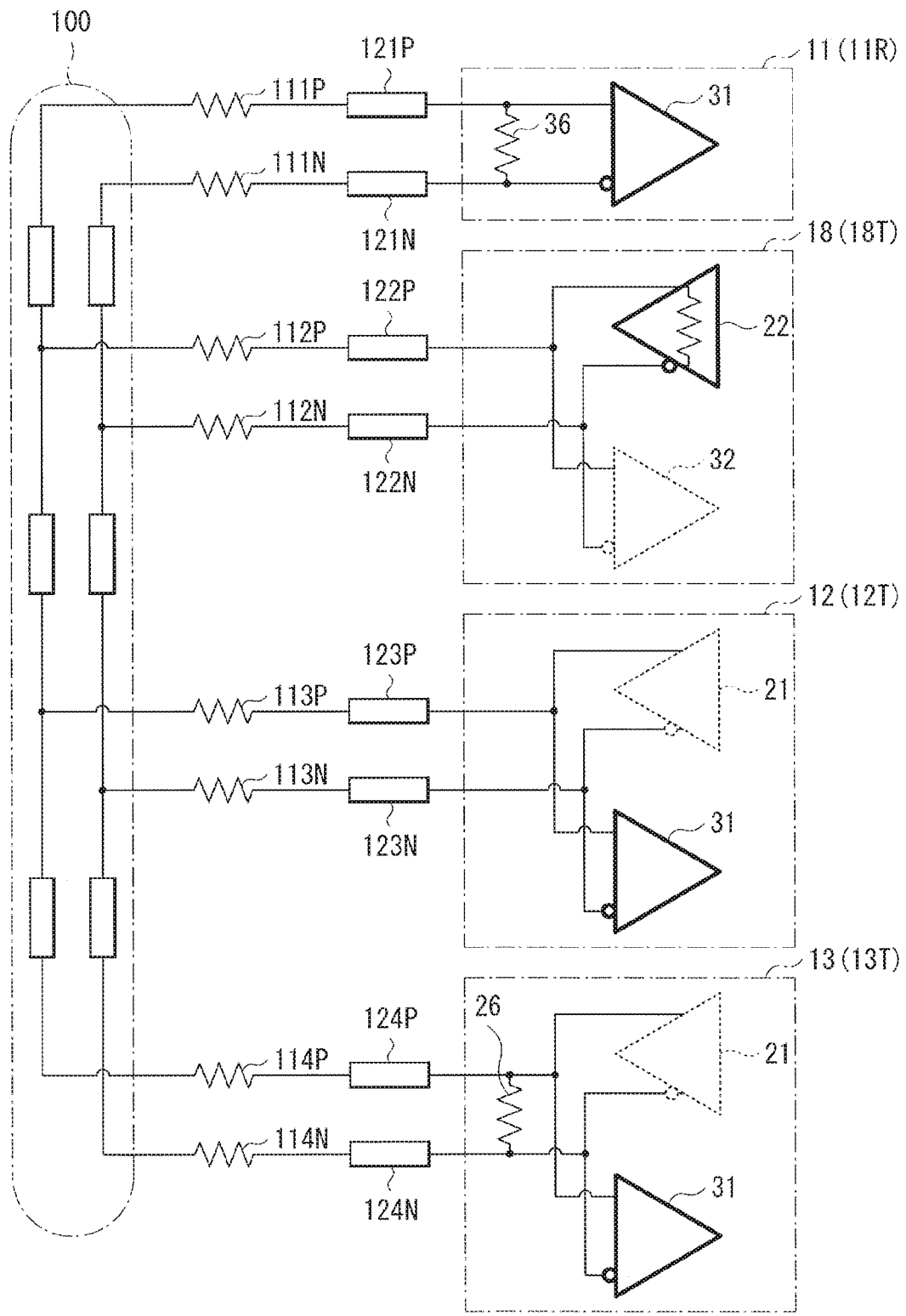
[FIG. 9B]

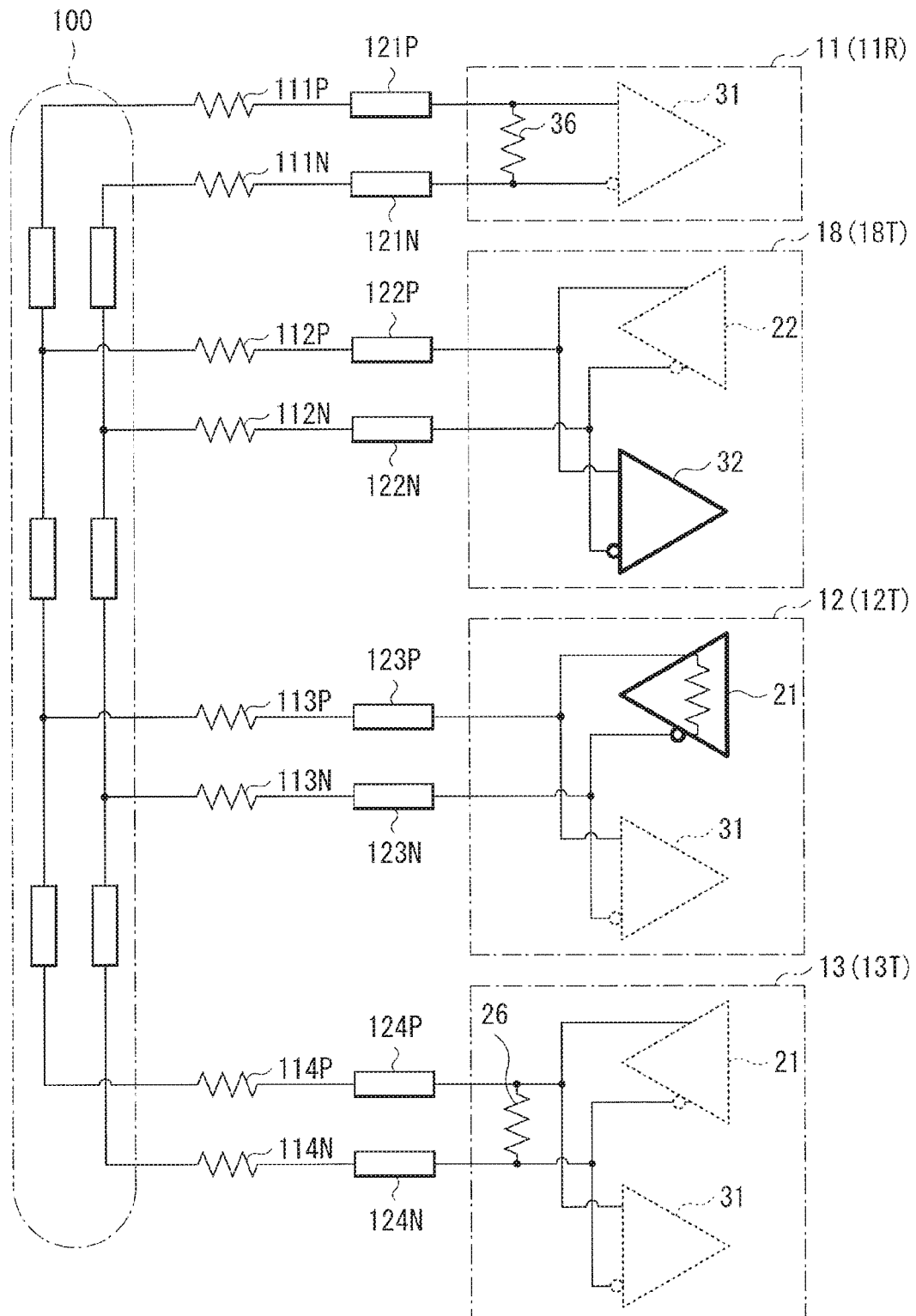
[FIG.9C]

[FIG.9D]
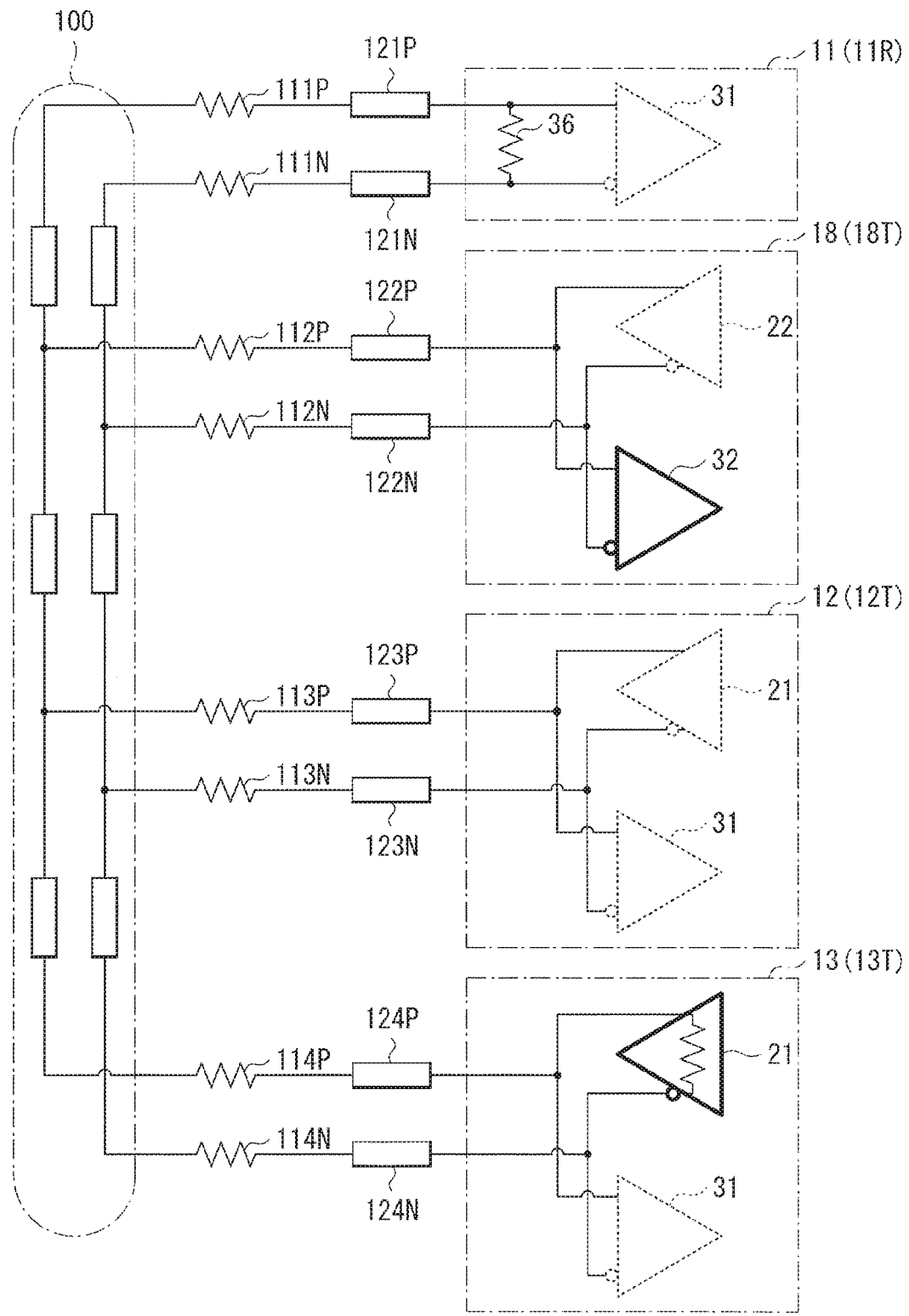

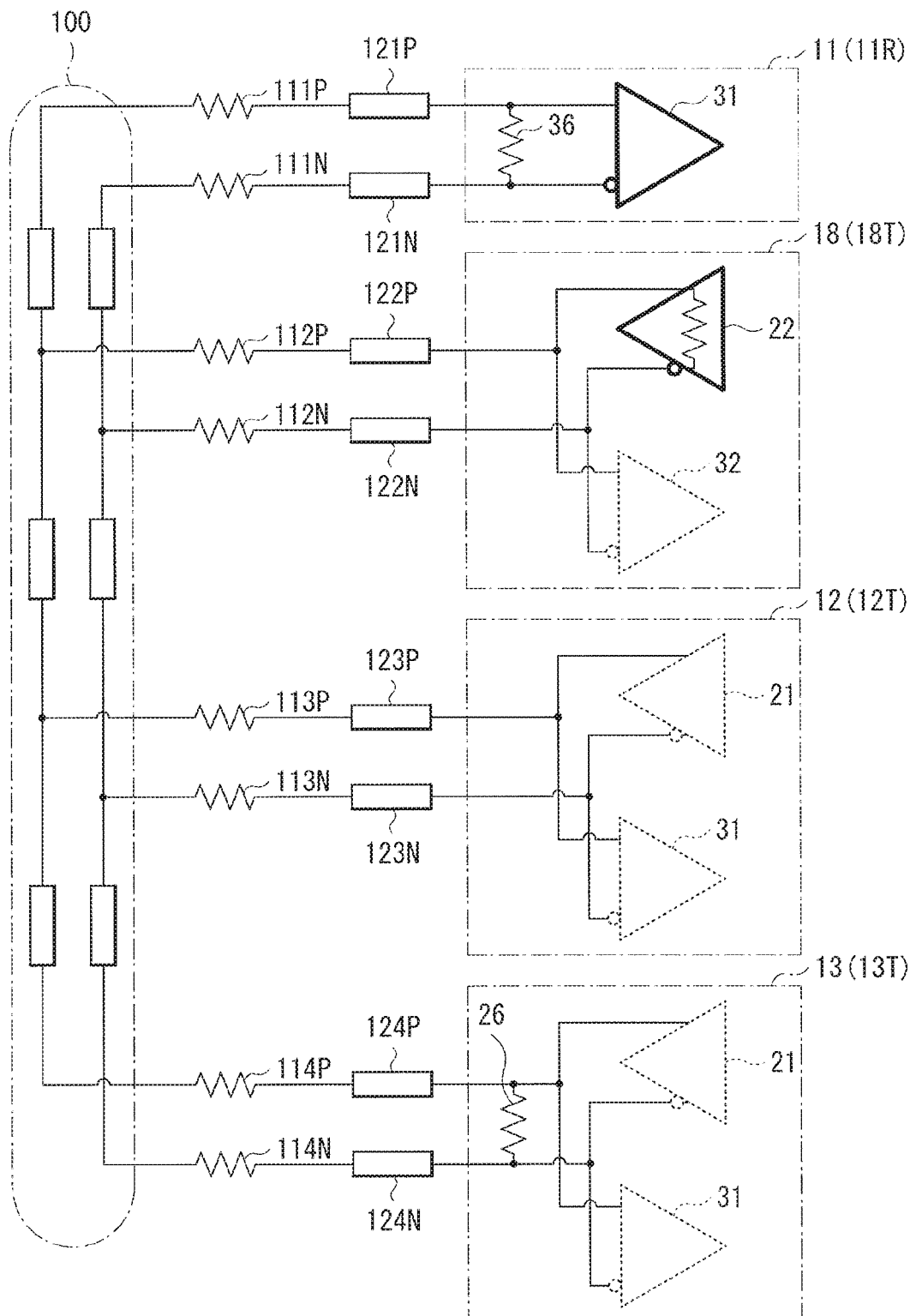
[FIG. 9E]

[ FIG. 10A ]
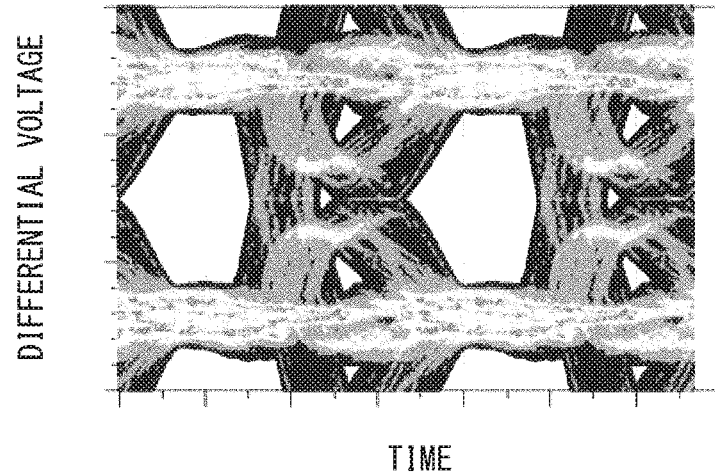
[ FIG. 10B ]
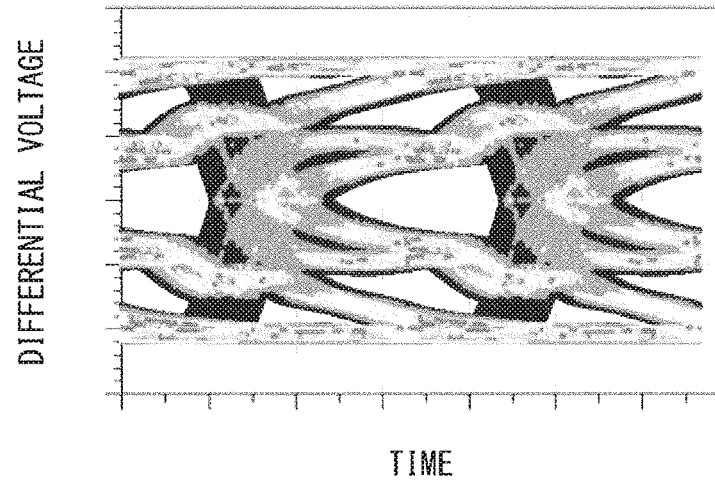
[ FIG. 11 ]
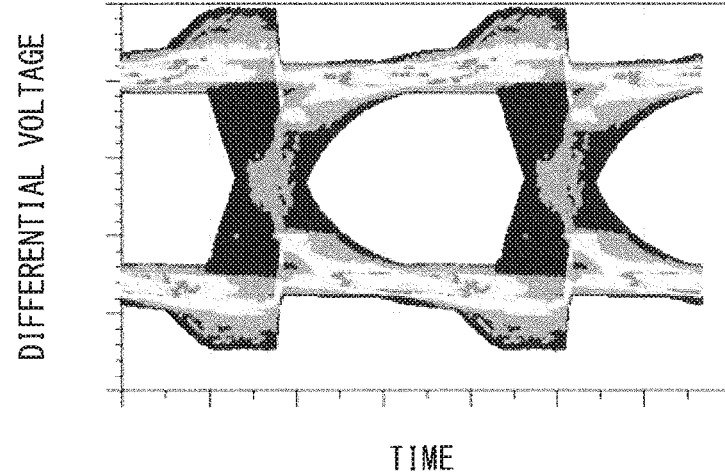

[ FIG. 12 ]
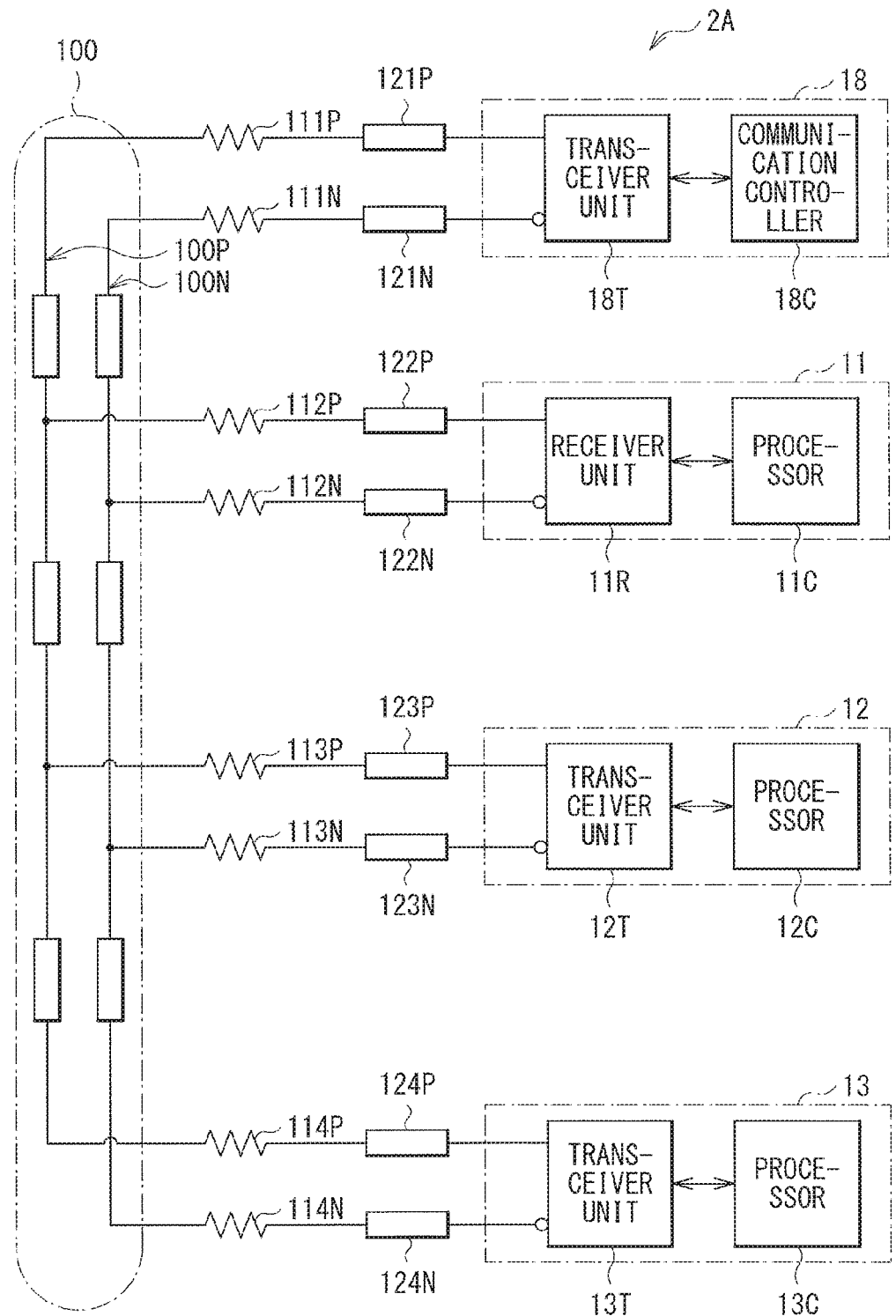

[FIG. 13A]
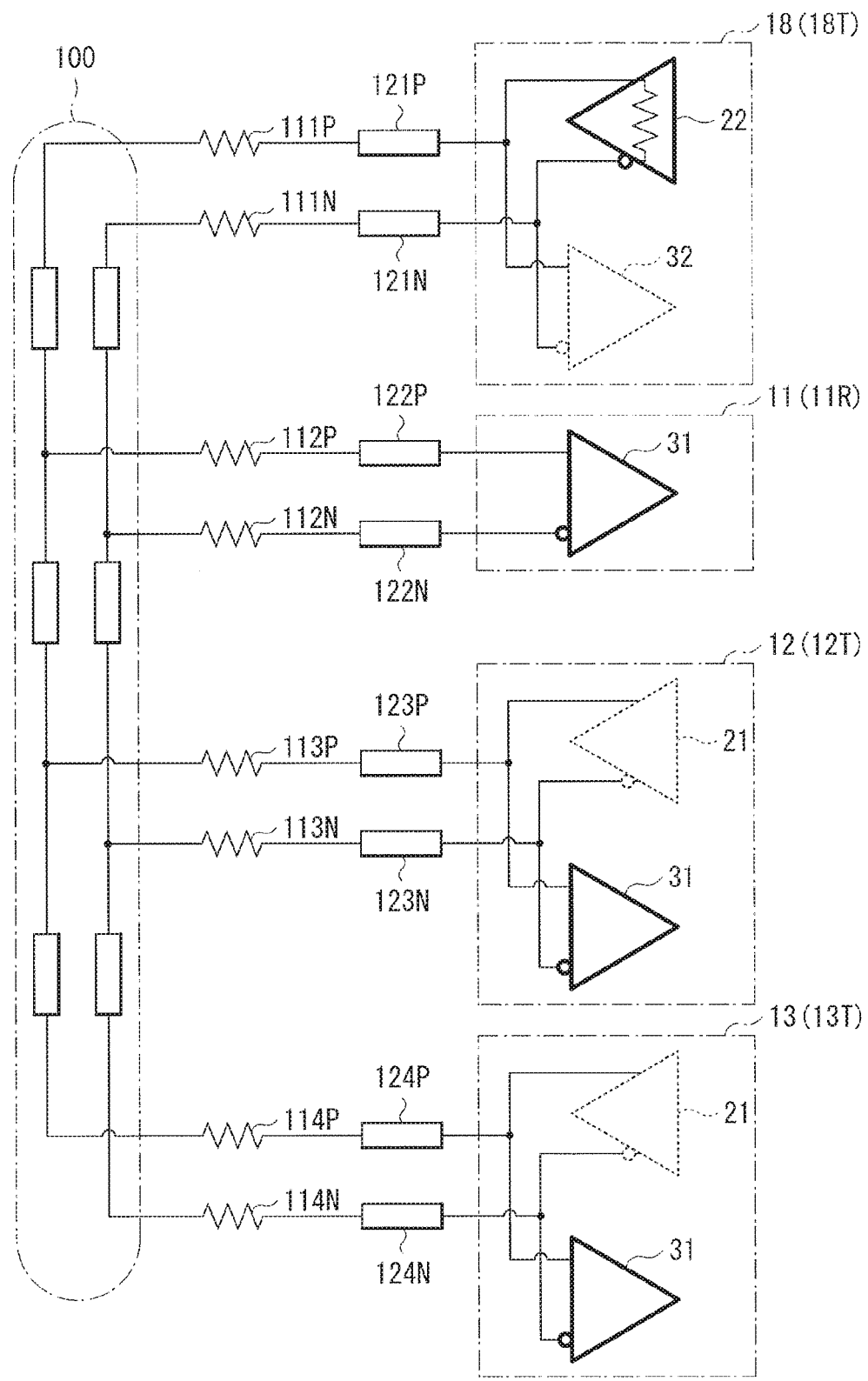

[ FIG. 13B ]
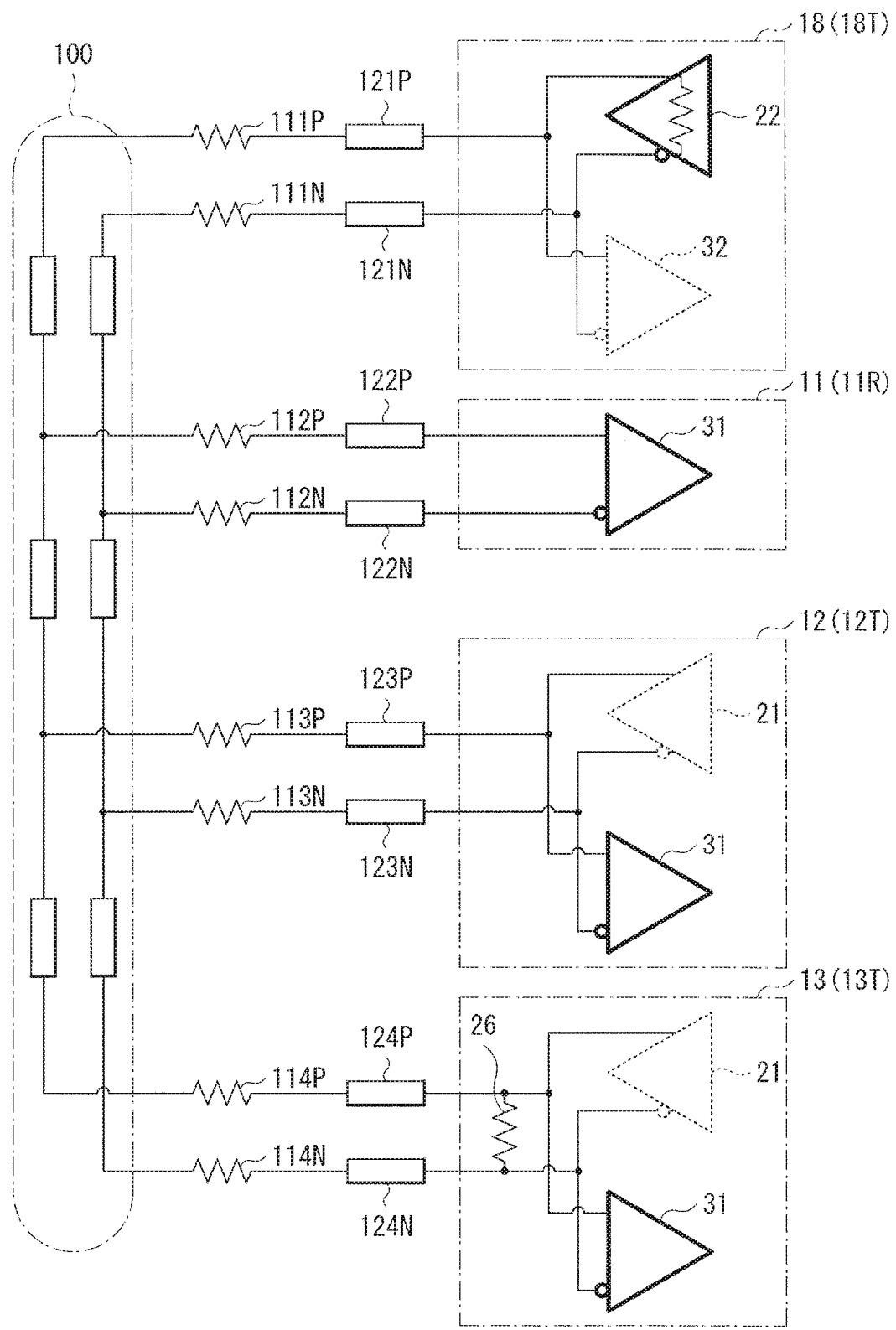

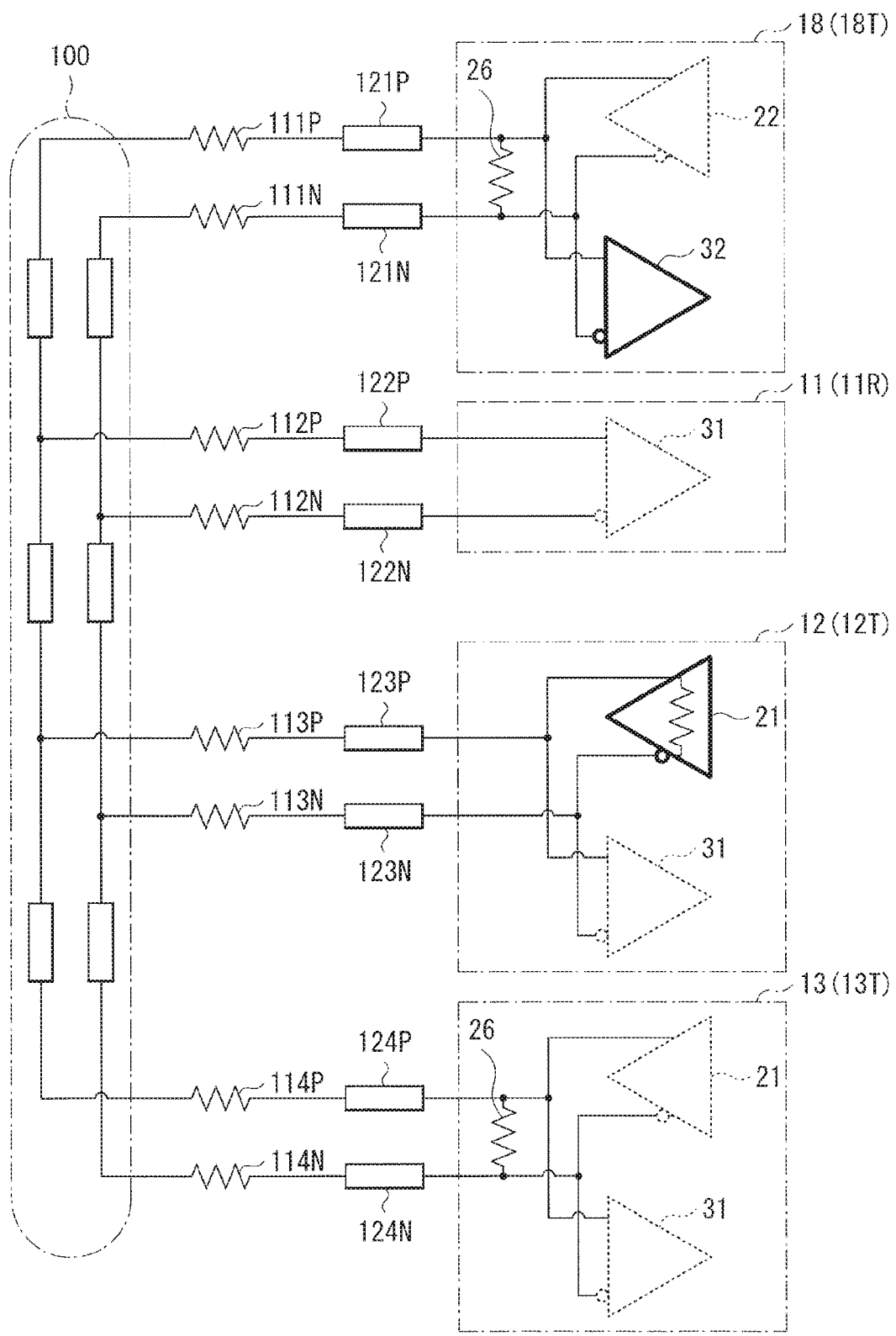
[FIG. 13C]

[ FIG. 14 ]
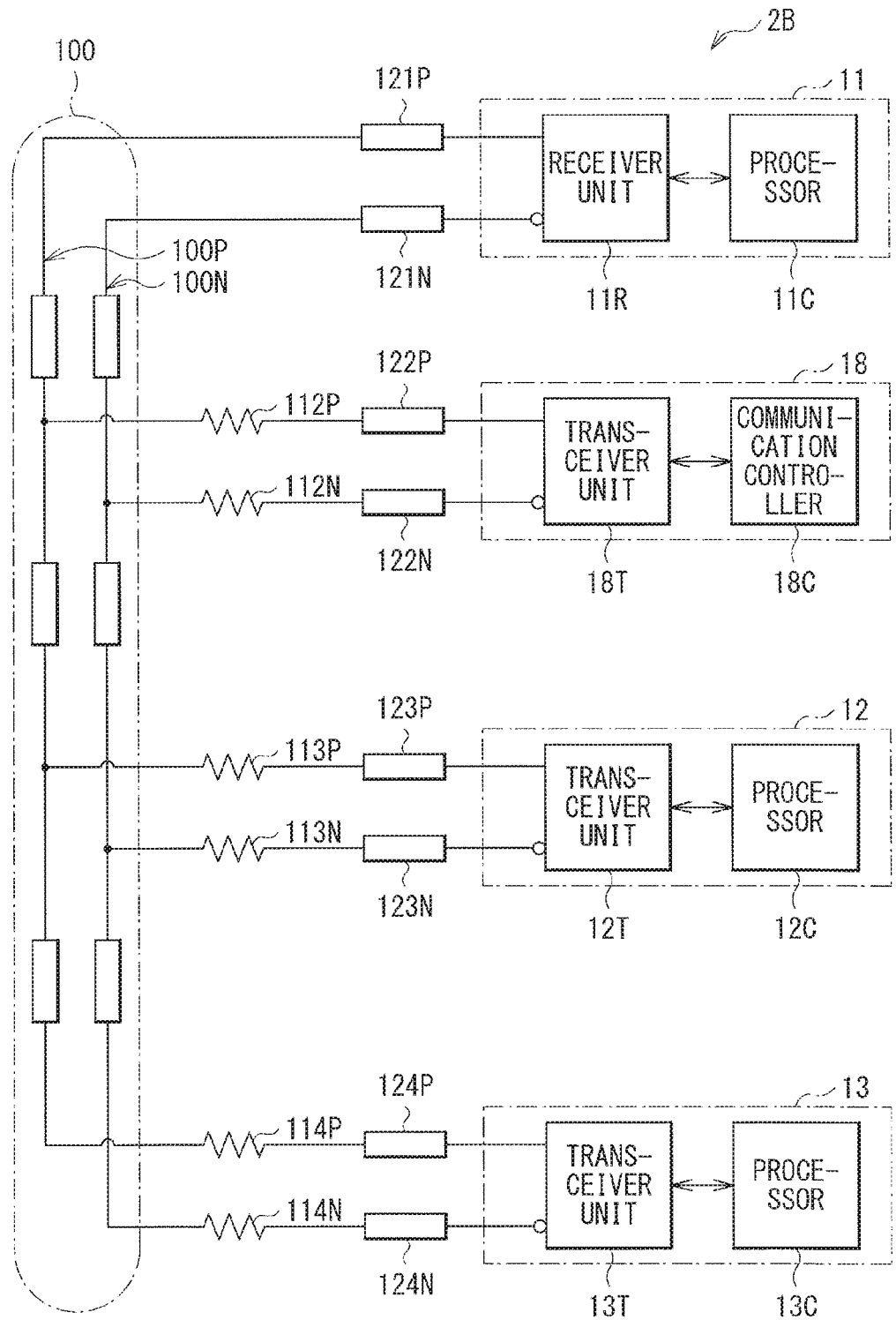

[ FIG. 15 ]
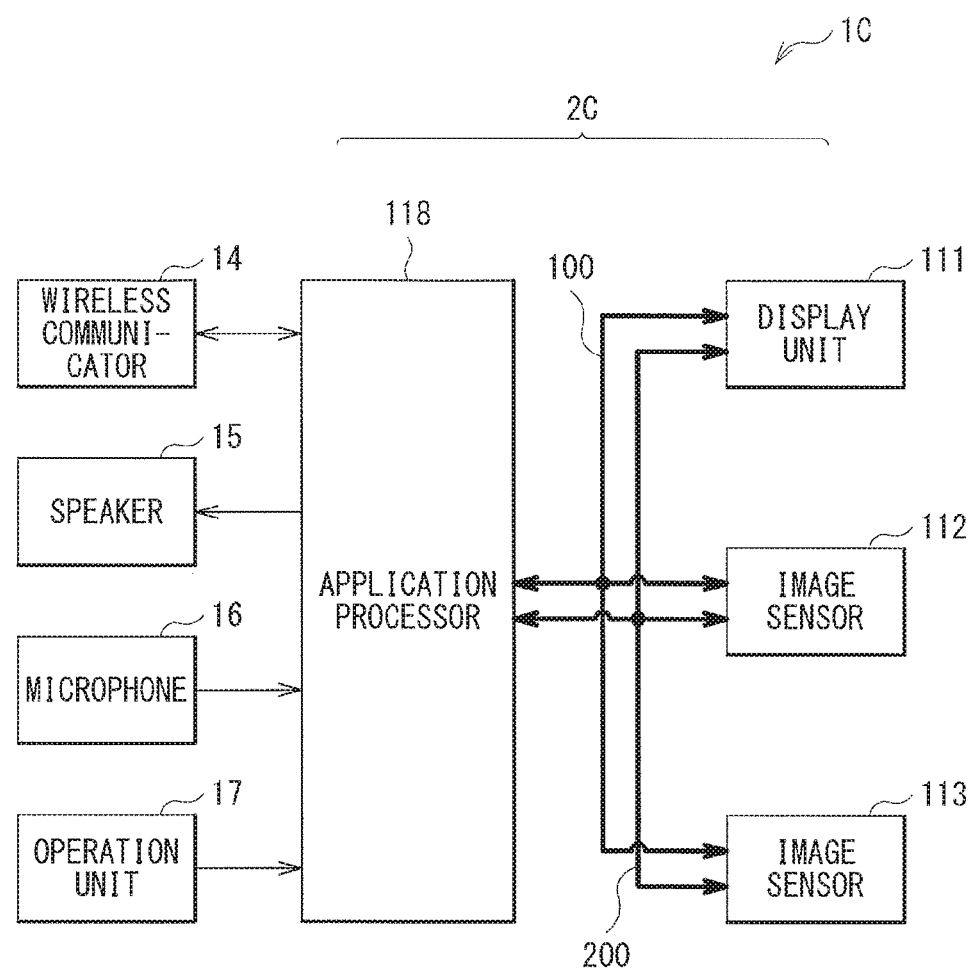

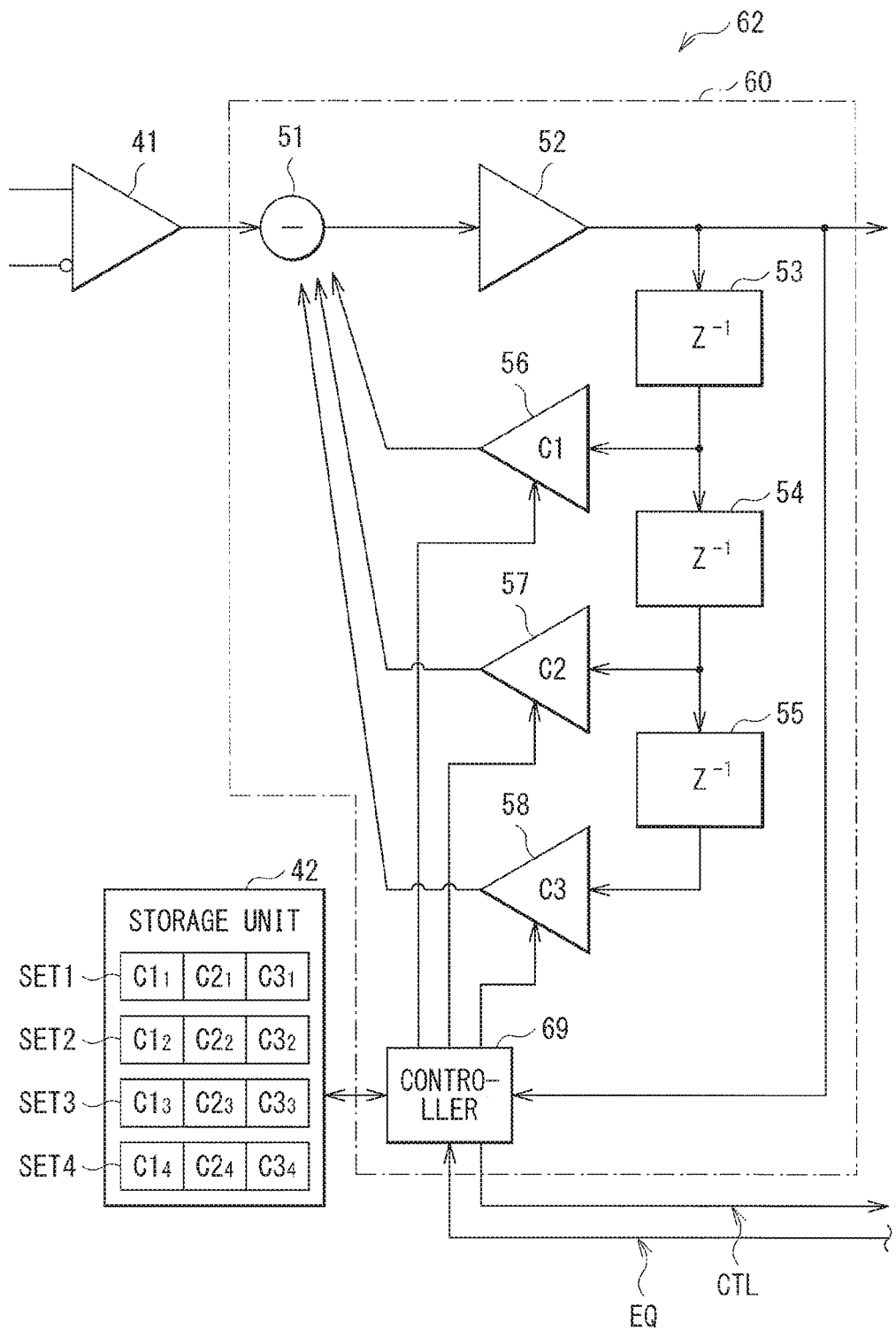
[FIG. 16]

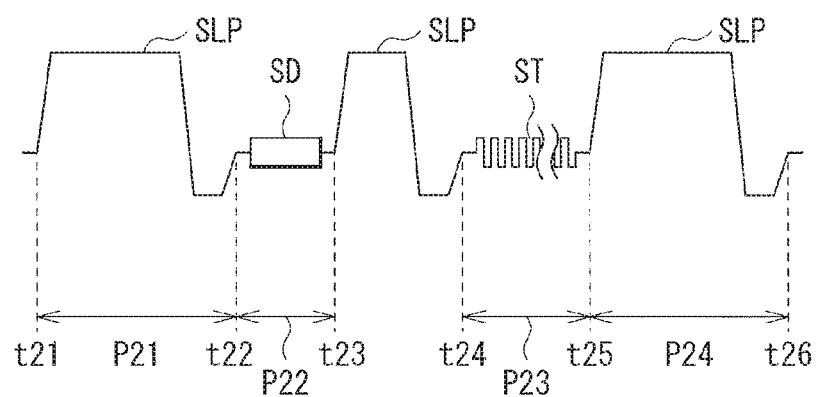
[ FIG. 17 ]

[FIG. 18]
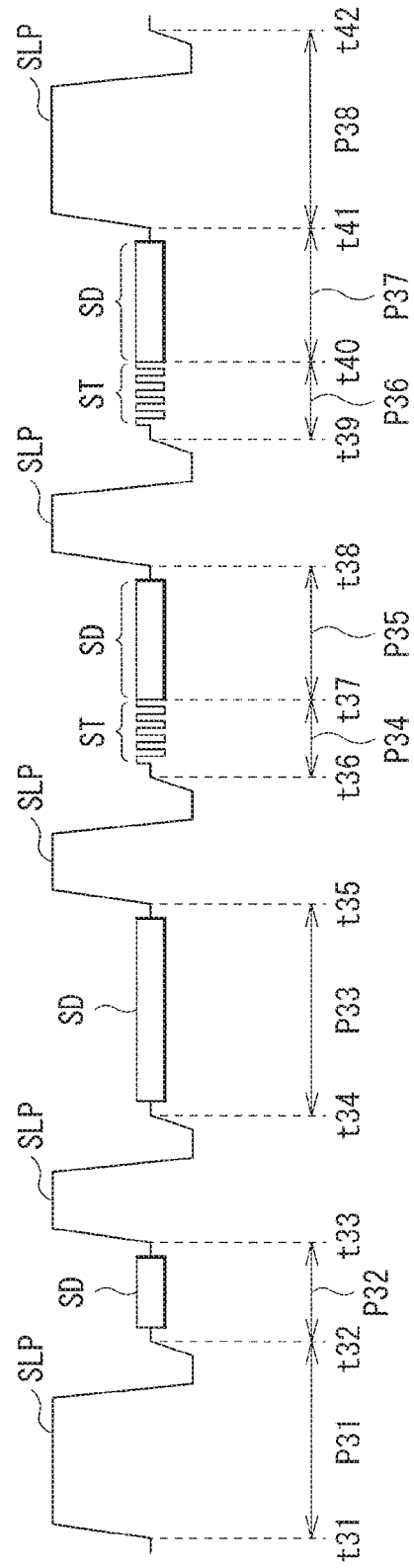

[ FIG. 19 ]
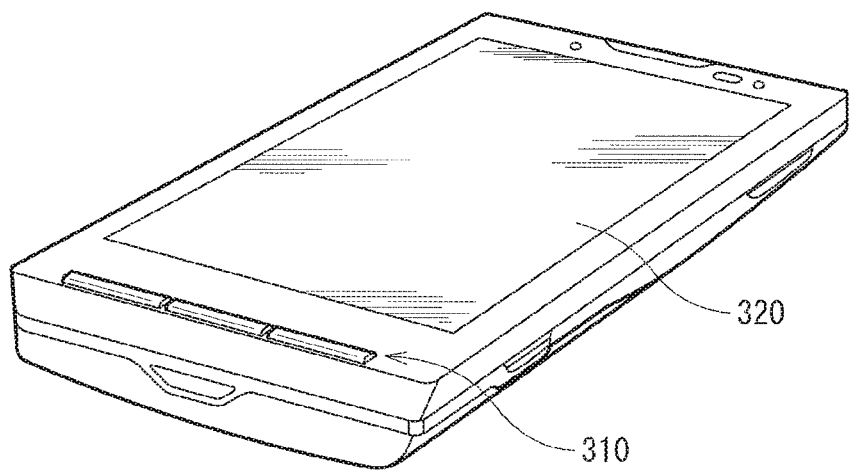

BUS SYSTEM AND COMMUNICATION DEVICE

TECHNICAL FIELD

The present disclosure relates to a bus system that performs exchange of data, and to a communication device used in such a bus system.

BACKGROUND ART

In association with high functionality and multi-functionality of electronic apparatuses in recent years, the electronic apparatuses include various devices such as a semiconductor chip, a sensor, and a display device. A lot of pieces of data are exchanged between these devices, and the amount of such data has been increased with high functionality and multi-functionality of the electronic apparatuses. Accordingly, the data are frequently exchanged with use of a high-speed interface that allows for transmission and reception of data at several Gbps, for example.

In a communication system, an equalizer is frequently used in order to enhance communication quality. For example, PTL 1 discloses a receiver including an equalizer.

CITATION LIST

Patent Literature

PTL 1: Japanese Unexamined Patent Application Publication No. 2015-73278

SUMMARY OF THE INVENTION

As described above, in the communication system, high communication quality is desired, and a further improvement in communication quality is expected.

It is desirable to provide a bus system and a communication device that allow for enhancement of communication quality.

A bus system according to an embodiment of the present disclosure includes: three or more devices and a bus. The three or more devices include one or a plurality of imaging devices, and transmit and receive a data signal in a time-division manner. The three or more devices are coupled to the bus, and the data signal is transmitted through the bus. A first device of the three or more devices includes an equalizer, a storage unit, and a communication controller. The equalizer has a first operation mode in which a received signal is equalized with use of a coefficient set including one or a plurality of equalization coefficients. The storage unit stores a plurality of the coefficient sets. The communication controller selects one of the plurality of the coefficient sets stored in the storage unit and causes the equalizer to operate in the first operation mode with use of the selected coefficient set.

A communication device according to an embodiment of the present disclosure includes an equalizer, a storage unit, and a communication controller. The equalizer has a first operation mode in which a received signal is equalized with use of a coefficient set including one or a plurality of equalization coefficients. The storage unit stores a plurality of the coefficient sets. The communication controller selects one of the plurality of the coefficient sets stored in the storage unit and causes the equalizer to operate in the first operation mode with use of the selected coefficient set.

In the bus system and the communication device according to the embodiments of the present disclosure, the equalizer operates in the first operation mode to equalize the received signal with use of the coefficient set including the one or plurality of equalization coefficients. The storage unit stores the plurality of coefficient sets. In a case where the equalizer operates in the first operation mode, the communication controller selects one of the plurality of coefficient sets. Thereafter, the equalizer performs equalization with use of the selected coefficient set.

According to the bus system and the communication device of the embodiments of the present disclosure, the plurality of coefficient sets are stored, and one coefficient set is selected from the plurality of coefficient sets and equalization is performed. This makes it possible to enhance communication quality. It is to be noted that an effect described above is not necessarily limited, and any of effects described in the present disclosure may be included.

BRIEF DESCRIPTION OF THE DRAWINGS

FIG. 1 is a block diagram illustrating a configuration example of a smartphone according to an embodiment of the present disclosure.

FIG. 2 is a circuit diagram illustrating a configuration example of a bus system illustrated in FIG. 1.

FIG. 3 is a circuit diagram illustrating a configuration example of a transceiver unit of an image sensor illustrated in FIG. 2.

FIG. 4 is a circuit diagram illustrating a configuration example of a transceiver unit of an application processor illustrated in FIG. 2.

FIG. 5 is a circuit diagram illustrating a configuration example of a receiver according to a first embodiment.

FIG. 6 is a circuit diagram illustrating a configuration example of a receiver unit illustrated in FIG. 2.

FIG. 7 is a timing chart illustrating an operation example of a bus system according to the first embodiment.

FIG. 8 is another timing chart illustrating an operation example of the bus system according to the first embodiment.

FIG. 9A is an explanatory diagram illustrating an operation state of the bus system according to the first embodiment.

FIG. 9B is an explanatory diagram illustrating another operation state of the bus system according to the first embodiment.

FIG. 9C is an explanatory diagram illustrating another operation state of the bus system according to the first embodiment.

FIG. 9D is an explanatory diagram illustrating another operation state of the bus system according to the first embodiment.

FIG. 9E is an explanatory diagram illustrating another operation state of the bus system according to the first embodiment.

FIG. 10A is a waveform diagram illustrating an operation example of a bus system according to a comparative example.

FIG. 10B is a waveform diagram illustrating an operation example of the bus system illustrated in FIG. 2.

FIG. 11 is a waveform diagram illustrating an operation example in a case where an equalizer is provided.

FIG. 12 is a circuit diagram illustrating a configuration example of a bus system according to a modification example of the first embodiment.

FIG. 13A is an explanatory diagram illustrating an operation state of the bus system illustrated in FIG. 12.

FIG. 13B is an explanatory diagram illustrating another operation state of the bus system illustrated in FIG. 12.

FIG. 13C is an explanatory diagram illustrating another operation state of the bus system illustrated in FIG. 12.

FIG. 14 is a circuit diagram illustrating a configuration example of a bus system according to another modification example of the first embodiment.

FIG. 15 is a block diagram illustrating a configuration example of a smartphone according to another modification example of the first embodiment.

FIG. 16 is a circuit diagram illustrating a configuration example of a receiver according to a second embodiment.

FIG. 17 is a timing chart illustrating an operation example of a bus system according to the second embodiment.

FIG. 18 is a timing chart illustrating an operation example of a bus system according to a modification example of the second embodiment.

FIG. 19 is a perspective view of a configuration example of a smartphone to which the bus system according to any of the embodiments is applied.

MODES FOR CARRYING OUT THE INVENTION

Some embodiments of the present disclosure are described in detail below with reference to the drawings. It is to be noted that description is given in the following order.
1. First Embodiment
2. Second Embodiment
3. Application Examples

1. First Embodiment

CONFIGURATION EXAMPLE

Entire Configuration Example

FIG. 1 illustrates a configuration example of a smartphone (a smartphone 1) including a bus system according to a first embodiment. It is to be noted that a communication device according to an embodiment of the present disclosure is embodied by the present embodiment and is therefore described together. The smartphone 1 includes a display unit 11, image sensors 12 and 13, a bus 100, a wireless communicator 14, a speaker 15, a microphone 16, an operation unit 17, and an application processor 18.

The display unit 11 displays an image, and is configured using, for example, a liquid crystal display panel or an organic EL (electroluminescence) display panel. The display unit 11 is coupled to the bus 100. The display unit 11 displays an image on the basis of image data that is supplied from the application processor 18 through the bus 100.

The image sensors 12 and 13 each image an object, and are configured using, for example, a CMOS (complementary metal oxide semiconductor) image sensor. In this example, the image sensor 12 is disposed on a surface opposite to a surface provided the display unit 11 in the smartphone 1, and has high resolution. Moreover, the image sensor 13 is disposed on the surface provided with the display unit 11 in the smartphone 1, and has low resolution. The image sensors 12 and 13 are coupled to the bus 100. In this example, the image sensors 12 and 13 perform an imaging operation on the basis of control data that is supplied from the application processor 18 through the bus 100, and supply imaging data to the application processor 18 through the bus 100.

The bus 100 transmits data between devices coupled to the bus. The bus 100 is coupled to the display unit 11, the image sensors 12 and 13, and the application processor 18.

The wireless communicator 14 performs wireless communication with a mobile phone base station. It is to be noted that the wireless communicator 14 may further have a function of performing wireless communication through, for example, wireless LAN (local area network), Bluetooth (registered trademark), NFC (near field communication), etc. without limitation. The wireless communicator 14 performs exchange of communication data with the application processor 18 in this example.

The speaker 15 outputs sound, and the microphone 16 receives sound. In this example, the speaker 15 receives sound data from the application processor 18, and the microphone 16 supplies sound data to the application processor 18.

The operation unit 17 is a user interface that receives an operation by a user, and is configured using, for example, a touch panel, various kinds of buttons, etc. The operation unit 17 supplies, to the application processor 18, operation data related to a user operation in this example.

The application processor 18 controls an operation of each of the devices in the smartphone 1. The application processor 18 is coupled to the bus 100. Further, the application processor 18 supplies the control data and the image data to the display unit 11 through, for example, the bus 100. In addition, the application processor 18 supplies the control data to the image sensors 12 and 13 through the bus 100, and receives the imaging data from the image sensors 12 and 13 through the bus 100. Furthermore, the application processor 18 also has functions of performing exchange of the communication data with the wireless communicator 14, supplying the sound data to the speaker 15, receiving the sound data from the microphone 16, and receiving the operation data from the operation unit 17.

(Bus System 2)

The bus 100 configures a bus system 2, together with the display unit 11, the image sensors 12 and 13, and the application processor 18. The bus system 2 is described in detail below.

FIG. 2 illustrates a configuration example of the bus system 2. The bus system 2 includes the bus 100, resistors 111P to 114P and 111N to 114N, the display unit 11, the application processor 18, and the image sensors 12 and 13. The bus system 2 couples the display unit 11 to one end of the bus 100, and couples the image sensor 13 to the other end of the bus 100. The display unit 11 includes a receiver unit 11R, and a processor 11C. The application processor 18 includes a transceiver unit 18T and a communication controller 18C. The image sensor 12 includes a transceiver unit 12T and a processor 12C. The image sensor 13 includes a transceiver unit 13T and a processor 13C.

The bus 100 includes transmission paths 100P and 100N. The transmission paths 100P and 100N transmit differential signals, and each include, for example, a wiring pattern on a printed circuit board. A characteristic impedance of each of the transmission paths 100P and 100N is about 50Ω in this example.

The transmission path 100P is coupled to a positive input terminal of the receiver unit 11R, a positive input-output terminal of the transceiver unit 18T, a positive input-output terminal of the transceiver unit 12T, and a positive input-output terminal of the transceiver unit 13T at respective positions different from one another in the transmission path 100P. One end of the transmission path 100P is coupled to the positive input terminal of the receiver unit 11R, and the other end thereof is coupled to the positive input-output terminal of the transceiver unit 13T. Likewise, the transmission path 100N is coupled to a negative input terminal of the receiver unit 11R, a negative input-output terminal of the transceiver unit 18T, a negative input-output terminal of the transceiver unit 12T, and a negative input-output terminal of the transceiver unit 13T, at respective positions different from one another in the transmission path 100N. One end of the transmission path 100N is coupled to the negative input terminal of the receiver unit 11R, and the other end thereof is coupled to the negative input-output terminal of the transceiver unit 13T.

The positive input terminal of the receiver unit 11R is coupled to the one end of the transmission path 100P through the resistor 111P and a transmission path 121P, and the negative input terminal thereof is coupled to the one end of the transmission path 100N through the resistor 111N and a transmission path 121N. The resistors 111P and 111N suppress reflection of signals as described later.

The positive input-output terminal of the transceiver unit 18T is coupled to the transmission path 100P through the resistor 112P and a transmission path 122P, and the negative input-output terminal thereof is coupled to the transmission path 100N through the resistor 112N and a transmission path 122N. The resistors 1121P and 112N suppress reflection of signals as described later.

The positive input-output terminal of the transceiver unit 12T is coupled to the transmission path 100P through the resistor 113P and a transmission path 123P, and the negative input-output terminal thereof is coupled to the transmission path 100N through the resistor 113N and a transmission path 123N. The resistors 113P and 113N suppress reflection of signals as described later.

The positive input-output terminal of the transceiver unit 13T is coupled to the other end of the transmission path 100P through the resistor 114P and a transmission path 124P, and the negative input-output terminal thereof is coupled to the other end of the transmission path 100N through the resistor 114N and a transmission path 124N. The resistors 114P and 114N suppress reflection of signals as described later.

(Image Sensors 12 and 13)

FIG. 3 illustrates a configuration example of the transceiver unit 12T of the image sensor 12. The transceiver unit 12T includes a driver 21, a receiver 31, a termination controller 23, switches 24 and 25, a resistor 26, and pads 27 and 28.

The driver 21 transmits a data signal SD and a training signal ST in a case where an output enable signal EN is active. The data signal SD is a differential signal that has, for example, a bit rate of several Gbps, and has a differential amplitude of about 200 mV. The data signal SD to be transmitted by the driver 21 of the image sensor 12 includes, for example, data (imaging data) of an age captured by the image sensor 12. The training signal ST is, for example, a signal having a predetermined training pattern such as an alternate pattern ("1010 . . . "), and has a bit rate and a differential amplitude that are similar to those of the data signal SD. It is to be noted that the training pattern is not limited to such an alternate pattern, and may be, for example, a pseudo-random pattern (PRBS; pseudo-random bit sequence). Upon transmission of the signal by the driver 21, an output impedance at each output terminal of the driver 21 is about 50Ω in this example. In addition, in a case where the output enable signal EN is inactive, the driver 21 makes the output impedance high.

The receiver 31 receives the data signal SD and a signal SLP (to be described later). The data signal SD to be received by the receiver 31 of the image sensor 12 includes, for example, control data for control of an operation of the image sensor 12.

The termination controller 23 turns on the switches 24 and 25 in a case where the output enable signal EN is inactive and an amplitude value of a signal at the input-output terminal of the transceiver unit 12T is equal to or smaller than a predetermined value Vth, and turns off the switches 24 and 25 in other cases. The predetermined value Vth is set to a value that is larger than an amplitude value of the data signal SD and is smaller than an amplitude value of the signal SLP to be described later. Further, in a case where a termination control signal Toff is active, the termination controller 23 forcibly turns off the switches 24 and 25 irrespective of the output enable signal EN and the amplitude value of the signal at the input-output terminal of the transceiver unit 12T.

The switches 24 and 25 are switches that are turned on or off on the basis of an instruction from the termination controller 23. One end of the switch 24 is coupled to the positive input-output terminal of the transceiver unit 12T, and the other end thereof is coupled to one end of the resistor 26. One end of the switch 25 is coupled to the negative input-output terminal of the transceiver unit 12T, and the other end thereof is coupled to the other end of the resistor 26.

The resistor 26 functions as a termination resistor of the transceiver unit 12T. One end of the resistor 26 is coupled to the other end of the switch 24, and the other end thereof is coupled to the other end of the switch 25. A resistance value of the resistor 26 is about 100Ω in this example.

The pad 27 is an input-output pad at the positive input-output terminal of the transceiver unit 12T, and the pad 28 is an input-output pad at the negative input-output terminal of the transceiver unit 12T. In this drawing, the pad 27 is illustrated as a capacitor inserted between the positive input-output terminal of the transceiver unit 12T and the ground, and the pad 28 is illustrated as a capacitor inserted between the negative input-output terminal of the transceiver unit 12T and the ground.

In the transceiver unit 12T, the termination control signal Toff is set to active. In other words, since the transceiver unit 12T is not coupled to the one end or the other end of the bus 100 as illustrated in FIG. 2, the termination control signal Toff is set to active in the transceiver unit 12T as described later. This forcibly turns off the switches 24 and 25, which forcibly disables the termination resistor (the resistor 26).

The processor 12C (FIG. 2) of the image sensor 12 performs predetermined processing on the basis of the control data included in the data signal SD received by the receiver 31. Moreover, the processor 12C also has a function of generating the output enable signal EN.

Although the image sensor 12 has been described above as an example, this also applies to the image sensor 13. In other words, the transceiver unit 13T of the image sensor 13 is similar to the transceiver unit 12T of the image sensor 12, and the processor 13C of the image sensor 13 is similar to the processor 12C of the image sensor 12. However, unlike the transceiver unit 12T of the image sensor 12, in the transceiver unit 13T of the image sensor 13, the termination control signal Toff is set to inactive. In other words, since the transceiver unit 13T is coupled to the other end of the bus 100 as illustrated in FIG. 2, the termination control signal Toff is set to inactive in the transceiver unit 13T as described later. As a result, in the transceiver unit 13T, the switches 24 and 25 are turned on in a case where the output enable signal EN is inactive and an amplitude value of a signal at the input-output terminal of the transceiver unit 13T is equal to or smaller than the predetermined value Vth, which enables the termination resistor (the resistor 26). Moreover, in other cases, the switches 24 and 25 are turned off, which disables the termination resistor (the resistor 26).

(Application Processor 18)

FIG. 4 illustrates a configuration example of the transceiver unit 18T of the application processor 18. The transceiver unit 18T includes a driver 22 and a receiver 32.

The driver 22 transmits the data signal SD and the signal SLP in a case where the output enable signal EN is active. The data signal SD to be transmitted by the driver 21 of the application processor 18 includes, for example, data (image data) of an image to be displayed on the display unit 11. The signal SLP is, for example, a signal having a low frequency and an amplitude of about 1 V. Upon output of the signal by the driver 22, an output impedance at each output terminal of the driver 22 is about 50Ω in this example. In addition, in a case where the output enable signal EN is inactive, the driver 21 makes the output impedance high.

The receiver 32 receives the data signal SD. The data signal SD to be received by the receiver 32 of the application processor 18 includes, for example, data (imaging data) of an image captured by the image sensors 12 and 13. The receiver 32 has a function of equalizing the received data signal SD on the basis of a control signal EQ.

In the transceiver unit 18T, the termination control signal Toff is set to active. In other words, since the transceiver unit 18T is not coupled to one end or the other end of the bus 100 as illustrated in FIG. 2, the termination control signal Toff is set to active in the transceiver unit 18T. As a result, in the transceiver unit 18T, the termination resistor (the resistor 26) is forcibly disabled.

FIG. 5 illustrates a configuration example of the receiver 32. The receiver 32 includes an amplifier 41, an equalizer 50, and a storage unit 42.

The amplifier 41 is a linear amplifier that converts a differential signal into a single phase signal and outputs the single phase signal.

The equalizer 50 equalizes an output signal of the amplifier 41, and is a so-called decision feedback equalizer (DFE). The equalizer 50 includes a subtraction unit 51, an amplifier 52, delay units 53 to 55, amplifiers 56 to 58, and a controller 59.

The subtraction unit 51 subtracts output signals of the amplifiers 56 to 58 from an output signal of the amplifier 41. The amplifier 52 amplifies an output signal of the subtraction unit 51. The delay unit 53 delays an output signal of the amplifier 52 by one unit interval. In other words, a delay amount in the delay unit 53 corresponds to the inverse of a bit rate of the data signal SD to be received by the receiver 32. The delay unit 54 delays an output signal of the delay unit 53 by one unit interval. The delay unit 55 delays an output signal of the delay unit 54 by one unit interval. The amplifier 56 amplifies an output signal of the delay unit 53 by a gain C1, and outputs the thus-amplified signal. The amplifier 57 amplifies an output signal of the delay unit 54 by a gain C2, and outputs the thus-amplified signal. The amplifier 58 amplifies an output signal of the delay unit 55 by a gain C3, and outputs the thus-amplified signal.

The controller 59 controls an operation of the equalizer 50 on the basis of the control signal EQ. The equalizer 50 has two operation modes M1 and M2. In the operation mode M1, the controller 59 sets each of the gains C1 to C3 of the amplifiers 56 to 58 to a gain supplied from the storage unit 42. Moreover, in the operation mode M2, the controller 59 monitors an eye opening of the output signal of the amplifier 52, adjusts the gains C1 to C3 of the amplifiers 56 to 58 to widen the eye opening, and then stores the adjusted gains C1 to C3 in the storage unit 42.

The storage unit 42 stores a plurality of coefficient sets SET each including the gains C1 to C3 in the equalizer 50. In this example, the storage unit 42 stores four coefficient sets SET1 to SET4. The coefficient set SET1 includes gains $C1_1$, $C2_1$, and $C3_1$ to be used in a case where the image sensor 12 transmits the data signal SD having a low bit rate. The coefficient set SET2 includes gains $C1_2$, $C2_2$, and $C3_2$ to be used in a case where the image sensor 12 transmits the data signal SD having a high bit rate. The coefficient set SET3 includes gains $C1_3$, $C2_3$, and $C3_3$ to be used in a case where the image sensor 13 transmits the data signal SD having a low bit rate. The coefficient set SET4 includes gains $C1_4$, $C2_4$, and $C3_4$ to be used in a case where the image sensor 13 transmits the data signal SD having a high bit rate.

The communication controller 18C (FIG. 2) of the application processor 18 controls an operation of the bus system 2. Specifically, the communication controller 18C causes the transceiver unit 18T to transmit the signal SLP and transmit the control data as the data signal SD, thereby controlling the operation of the bus system 2, as described later. At this occasion, the communication controller 18C is allowed to give an instruction of a communication band, resolution of the image, etc. to the image sensors 12 and 13, for example. Moreover, the communication controller 18C also has a function of generating the output enable signal EN and the control signal EQ.

With this configuration, for example, in a case where the smartphone 1 is powered up or is returned from a sleep mode to a normal operation mode, in the application processor 18, the communication controller 18C instructs the equalizer 50 with use of the control signal EQ to operate in the operation mode M2. Specifically, the communication controller 18C first causes the image sensor 12 to transmit the training signal ST having a low bit rate. While the equalizer 50 receives the training signal ST, the equalizer 50 adjusts the gains C1 to C2 to widen the eye opening of the output signal of the amplifier 52, and stores the adjusted gains C1 to C3 as gains $C1_1$ to $C3_1$ (the coefficient set SET1) in the storage unit 42. Likewise, the communication controller 18C causes the image sensor 12 to transmit the training signal ST having a high bit rate, and the equalizer 50 adjusts the gains C1 to C3 and stores the adjusted gains C1 to C3 as the gains $C1_2$ to $C3_2$ (the coefficient set SET2) in the storage unit 42. Moreover, the communication controller 18C causes the image sensor 13 to transmit the training signal ST having a low bit rate, and the equalizer 50 adjusts the gains C1 to C3 and stores the adjusted gains C1 to C3 as the gains $C1_3$ to $C3_3$ (the coefficient set SET3) in the storage unit 42. Further, the communication controller 18C causes the image sensor 13 to transmit the training signal ST having a high bit rate, and the equalizer 50 adjusts the gains C1 to C3 and stores the adjusted gains C1 to C3 as the gains $C1_4$ to $C3_4$ (the coefficient set SET4) in the storage unit 42.

Thereafter, the communication controller 18C instructs the equalizer 50 with use of the control signal EQ to operate in the operation mode M1, and causes the image sensors 12 and 13 to transmit the data signal SD including the imaging data. At this occasion, the controller 59 selects the coefficient set SET corresponding to the received data signal SD from the coefficient sets SET1 to SET4 on the basis of the control signal EQ, and sets the gains C1 to C3 of the amplifiers 56 to 58. Thus, the equalizer 50 equalizes the output signal of the amplifier 41 while keeping the gains C1 to C3 of the amplifiers 56 to 58 constant.

(Display Unit 11)

FIG. 6 illustrates a configuration example of the receiver unit 11R of the display unit 11. The receiver unit 11R includes a receiver 31, a controller 33, switches 34 and 35, a resistor 36, and pads 37 and 38.

The controller 33 turns on the switches 34 and 35 in a case where an amplitude value of a signal at an input terminal of the receiver unit 11R is equal to or smaller than the predetermined value Vth, and turns off the switches 34 and 35 in other cases. Further, in the case where the termination control signal Toff is active, the controller 33 forcibly turns off the switches 34 and 35 irrespective of the amplitude value of the signal at the input terminal of the receiver unit 11R.

The switches 34 and 35 are switches that are turned on or off on the basis of an instruction from the controller 33. One end of the switch 34 is coupled to the positive input terminal of the receiver unit 11R, and the other end thereof is coupled to one end of the resistor 36. One end of the switch 35 is coupled to the negative input terminal of the receiver unit 11R, and the other end thereof is coupled to the other end of the resistor 36.

The resistor 36 functions as an input termination resistor of the receiver unit 11R. The one end of the resistor 36 is coupled to the other end of the switch 34, and the other end thereof is coupled to the other end of the switch 35. A resistance value of the resistor 36 is about 100Ω in this example.

The pad 37 is an input pad at the positive input terminal of the receiver unit 11R, and the pad 38 is an input pad at the negative input terminal of the receiver unit 11R.

In the receiver unit 11R, the termination control signal Toff is set to inactive. In other words, since the receiver unit 11R is coupled to the one end of the bus 100 as illustrated in FIG. 2, in the receiver unit 11R, the termination control signal Toff is set to inactive as described later. Accordingly, in the case where the amplitude value of the signal at the input terminal of the receiver unit 11R is equal to or smaller than the predetermined value Vth, in the receiver unit 11R, the switches 34 and 35 are turned on, which enables the termination resistor (the resistor 36). In addition, in a case where the amplitude value of the signal at the input terminal of the receiver unit 11R is larger than the predetermined value Vth, the switches 34 and 35 are turned off, which disables the termination resistor (the resistor 36).

The processor 11C (FIG. 2) of the display unit 11 performs predetermined processing on the basis of the control data included in the data signal SD received by the receiver 31.

Herein, the application processor 18 corresponds to a specific example of a "first device" in the present disclosure. The operation mode M1 corresponds to a specific example of a "first operation mode" in the present disclosure. The operation mode M2 corresponds to a specific example of a "second operation mode" in the present disclosure. The training signal ST corresponds to a specific example of a "pattern signal" in the present disclosure.

[Operation and Workings]

Next, description is given of an operation and workings of the smartphone 1 according to the present embodiment.

(Entire Operation Outline)

First, an entire operation outline of the smartphone 1 is described with reference to FIG. 1. The display unit 11 displays an image on the bases of image data that is supplied from the application processor 18 through the bus 100. The image sensors 12 and 13 perform an imaging operation on the basis of control data that is supplied from the application processor 18 through the bus 100, and supply imaging data to the application processor 18 through the bus 100. The wireless communicator 14 performs wireless communication with a mobile phone base station and performs exchange of communication data with the application processor 18. The speaker 15 receives sound data from the application processor 18, and outputs sound. The microphone 16 supplies inputted sound as sound data to the application processor 18. The operation unit 17 receives an operation by a user and supplies operation data to the application processor 18. The application processor 18 controls an operation of each of the devices in the smartphone 1.

(Detailed Operation)

In the bus system 2, a termination resistor is dynamically turned on or off in each of devices coupled to both ends of the bus 100. Specifically, in the receiver unit 11R of the display unit 11 coupled to the one end of the bus 100, the termination resistor (the resistor 36) is enabled in the case where the amplitude value of the signal at the input terminal is equal to or smaller h the predetermined value Vth, and the termination resistor (the resistor 36) is disabled in other cases. Moreover, in the transceiver unit 13T of the image sensor 13 coupled to the other end of the bus 100, the termination resistor (the resistor 26) is enabled in the case where the output enable signal EN is inactive and the amplitude value of the signal at the input-output terminal is equal to or smaller than the predetermined value Vth, and the termination resistor (the resistor 26) is disabled in other cases. Further, in the transceiver unit 18T of the application processor 18 and the transceiver unit 12T of the image sensor 12, the termination resistor (the resistor 26) is forcibly disabled.

Moreover, in the bus system the equalizer 50 of the application processor 18 equalizes the data signal SD transmitted from the image sensors 12 and 13. Specifically, in the case where the smartphone 1 is powered up or is returned from the sleep mode to the normal operation mode, the application processor 18 first operates in the operation mode M2, and causes the image sensors 12 and 13 to transmit the training signal ST. Subsequently, the equalizer 50 generates four coefficient sets SET1 to SET4 on the basis of the training signal ST. Thereafter, the application processor 18 operates in the operation mode M1, and causes the image sensors 12 and 13 to transmit the data signal SD including the imaging data. Subsequently, the equalizer 50 equalizes the data signal SD with use of the coefficient set selected from the four coefficient sets SET1 to SET4.

The operation of such a bus system 2 is described in detail below.

FIGS. 7 and 8 each illustrate a waveform diagram of signals in the bus 100. FIGS. 9A to 9E illustrate operation states of the bus system 2 in various periods. In FIGS. 9A to 9E, the drivers 21 and 22 illustrated by solid lines each indicate a driver transmitting a signal, and drivers 21 and 22 illustrated by dashed lines each indicate a driver not transmitting a signal. A resistor that indicates an output impedance is illustrated between a positive output terminal and a negative output terminal in the driver transmitting the signal. A resistance value of the resistor is about 100Ω in this example. Likewise, the receivers 31 and 32 illustrated by solid lines each indicate a receiver receiving a signal, and the receivers 31 and 32 illustrated by dashed lines each indicate a receiver not receiving a signal. In addition, for convenience of description, in FIGS. 9A to 9E, only an enabled termination resistor is illustrated, and a disabled termination resistor is not illustrated.

In the bus system 2, the application processor 18 first gives an instruction of the order of communication, communication bands, etc. to the display unit 11 and the image sensors 12 and 13. Thereafter, the display unit 11 and the image sensors 12 and 13 each perform communication in the instructed order. This operation is described in detail below.

First, the driver 22 of the application processor 18 transmits the signal SLP in a period from a timing t1 to a timing t2 (a reset period P1) on the basis of an instruction from the communication controller 18C, as illustrated in FIG. 7. Specifically, the communication controller 18C sets the output enable signal EN to active, and controls the driver 22 to transmit the signal SLP.

In the reset period P1, the driver 22 of the application processor 18 transmits the signal SLP, and the receivers 31 of the display unit 11 and the image sensors 12 and 13 receive this signal SLP, as illustrated in FIG. 9A. At this time, in the receiver unit 11R coupled to the one end of the bus 100, the amplitude value of the signal at the input terminal is larger than the predetermined value Vth, which disables the termination resistor (the resistor 36). Moreover, in the transceiver unit 13T coupled to the other end of the bus 100, the amplitude value of the signal at the input-output terminal is larger than the predetermined value Vth, which disables the termination resistor (the resistor 26).

The display unit 11 and the image sensors 12 and 13 receive such a signal SLP. The processor 11C of the display unit 11 and the processors 12C and 13C of the image sensors 12 and 13 then prepare for an instruction from the application processor 18 in a subsequent period (an instruction period P2).

Next, the driver 22 of the application processor 18 transmits the data signal SD including the control data in a period from the timing t2 to a timing t3 (the instruction period P2) on the basis of an instruction from the communication controller 18C, as illustrated in FIG. 7. Specifically, the communication controller 18C sets the output enable signal EN to active, and controls the driver 22 to transmit the data signal SD including the control data. The application processor 18 thus gives an instruction of the order of communication, communication bands, etc to the display unit 11 and the image sensors 12 and 13.

In the instruction period P2, the driver 22 of the application processor 18 transmits the data signal SD, and the receivers 31 of the display unit 11 and the image sensors 12 and 13 receive this data signal SD, as illustrated in FIG. 9B. At this time, in the receiver unit 11R coupled to the one end of the bus 100, the amplitude value of the signal at the input terminal is equal to or smaller than the predetermined value Vth, which enables the termination resistor (the resistor 36). Moreover, in the transceiver unit 13T coupled to the other end of the bus 100, the output enable signal EN is inactive and the amplitude value of the signal at the input-output terminal is equal to or smaller than the predetermined value Vth, which enables the termination resistor (the resistor 26).

It is to be noted that in this example, the application processor 18 transmits the data signal SD (the control data) to three devices (the display unit 11 and the image sensors 12 and 13) at the same time; however, there is no limitation thereto. For example, the application processor 18 may sequentially transmit the data signal SD (the control data) to the three devices in a time-division manner.

In this example, the application processor 18 instructs the image sensor 12 to transmit the training signal ST having a low bit rate in a first training period (a training period P3), and transmit the training signal ST having a high bit rate in a subsequent training period (a training period P5). Moreover, the application processor 18 instructs the image sensor 13 to transmit the training signal ST having a low bit rate in a subsequent training period (a training period P5) and transmit the training signal ST having a high bit rate in a subsequent training period (a training period P6). The processors 12C and 13C of the image sensors 12 and 13 thereafter perform communication in accordance with this instruction.

Next, the driver 22 of the application processor 18 transmits the signal SLP in a period from the timing t3 to a timing t4 on the basis of an instruction from the communication controller 18C, as illustrated in FIG. 7. At this time, the driver 22 transmits the signal SLP in a period shorter than the reset period P1. The operation state of the bus system 2 in this period is similar to the operation state in the reset period P1 (FIG. 9A). The processor 11C of the display unit 11 and the processors 12C and 13C of the image sensors 12 and 13 grasp start of a subsequent new training period (the training period P3) on the basis of this signal SLP. The image sensor 12 then prepares for transmission of the training signal ST in this training period.

Next, the driver 21 of the image sensor 12 transmits the training signal ST having a low bit rate in a period from the timing t4 to a timing t5 (the training period P3) on the basis of an instruction from the processor 12C, as illustrated in FIG. 7. Specifically, the processor 12C controls the driver 21 to set the output enable signal EN to active and transmit the training signal ST having a low bit rate.

in the training period P3, the driver 21 of the image sensor 12 transmits the training signal ST, and the receiver 32 of the application processor 18 receives this training signal ST, as illustrated in FIG. 9C. At this time, in the receiver unit 11R coupled to the one end of the bus 100, the amplitude value of the signal at the input terminal is equal to or smaller than the predetermined value Vth, which enables the termination resistor (the resistor 36). As described above, the receiver unit 11R enables the termination resistor in spite of not receiving the data signal SD. Further, in the transceiver unit 13T coupled to the other end of the bus 100, the output enable signal EN is inactive and the amplitude value of the signal at the input-output terminal is equal to or smaller than the predetermined value Vth, which enables the termination resistor (the resistor 26). As described above, the transceiver unit 13T enables the termination resistor in spite of not transmitting and not receiving the data signal SD.

In the receiver 32 of the application processor 18, the equalizer 50 operates in the operation mode M2 on the basis of an instruction from the communication controller 18C, and adjusts gains C1 to C3 to widen the eye opening of the output signal of the amplifier 52 while equalizing the training signal ST having a low bit rate. Thereafter, the equalizer 50 stores the adjusted gains C1 to C3 as gains $C1_1$ to $C3_1$ (the coefficient set SET1) in the storage unit 42.

Next, the driver 22 of the application processor 18 transmits the signal SLP in a period from the timing t5 to a timing t6 on the basis of an instruction from the communication controller 18C, as illustrated in FIG. 7. At this time, the driver 22 transmits the signal SLP in a period shorter than the reset period P1. The operation state of the bus system 2 in this period is similar to the operation state in the reset period P1 (FIG. 9A). The processor 11C of the display unit 11 and the processors 12C and 13C of the image sensors 12 and 13 grasp start of a subsequent new training period (the training period P4) on the basis of this signal SLP. The processor 12C of the image sensor 12 then prepares for transmission of the training signal ST in this training period.

Next, in a period from the timing t6 to a timing t7 (the training period P4), the driver 21 of the image sensor 12 transmits the training signal ST having a high bit rate on the basis of an instruction from the processor 12C, and the receiver 32 of the application processor 18 receives this training signal ST, as illustrated in FIG. 7. The operation state of the bus system 2 in this period is similar to the operation state in the training period P3 (FIG. 9C).

In the receiver 32 of the application processor 18, the equalizer 50 operates in the operation mode M2 on the basis of an instruction from the communication controller 18C, and adjusts the gain C1 to C3 to widen the eye opening of the output signal of the amplifier 52 while equalizing the training signal ST having a high bit rate. Thereafter, the equalizer 50 stores the adjusted gains C1 to C3 as gains $C1_2$ to $C3_2$ (the coefficient set SET2) in the storage unit 42.

Next, the driver 22 of the application processor 18 transmits the signal SLP in a period from the timing t7 to a timing t8 on the basis of an instruction from the communication controller 18C, as illustrated in FIG. 7. At this time, the driver 22 transmits the signal SLP in a period shorter than the rest period P1. The operation state of the bus system 2 in this period is similar to the operation state (FIG. 9A) in the reset period P1. The processor 11C of the display unit 11 and the processors 12C and 13C of the image sensors 12 and 13 grasp start of a subsequent new training period (the training period P5) on the basis of this signal SLP. The processor 13C of the image sensor 13 then prepares for transmission of the training signal ST in this training period.

Next, the driver 21 of the image sensor 13 transmits the training signal ST having a low bit rate in a period from the timing t8 to a timing t9 (the training period P5) on the basis of an instruction from the processor 13C, as illustrated in FIG. 7. Specifically, the processor 13C controls the driver 21 to set the output enable signal EN to active and transmit the training signal ST having a low bit rate.

In the training period P5, the driver 21 of the image sensor 13 transmits the training signal ST, and the receiver 32 of the application processor 18 receives this training signal ST, as illustrated in FIG. 9D. At this time, in the receiver unit 11R coupled to the one end of the bus 100, the amplitude value of the signal at the input terminal is equal to or smaller than the predetermined value Vth, which enables the termination resistor (the resistor 36). As described above, the receiver unit 11R enables the termination resistor in spite of not receiving the data signal SD. In contrast, in the transceiver unit 13T coupled to the other end of the bus 100, the output enable signal EN is active, which disables the termination resistor (the resistor 26). In other words, in the transceiver unit 13T, the output impedance of the driver 21 functions as an output termination resistor, which disables the termination resistor (the resistor 26).

In the receiver 32 of the application processor 18, the equalizer 50 operates in the operation mode M2 on the basis of an instruction from the communication controller 18C, and adjusts the gains C1 to C3 to widen the eye opening of the output signal of the amplifier 52 while equalizing the training signal ST having a low bit rate. Thereafter, the equalizer 50 stores the adjusted gains C1 to C3 as gains $C1_3$ to $C3_3$ (the coefficient set SET3) in the storage unit 42.

Next, the driver 22 of the application processor 18 transmits the signal SLP in a period from the timing t9 to a timing t10 on the basis of an instruction from the communication controller 18C, as illustrated in FIG. 7. At this time, the driver 22 transmits the signal SLP in a period shorter than the rest period P1. The operation state of the bus system 2 in this period is similar to the operation state (FIG. 9A) in the reset period P1. The processor 11C of the display unit 11 and the processors 12C and 13C of the image sensors 12 and 13 grasp start of a subsequent new training period (the training period P6) on the basis of this signal SLP. The processor 12C of the image sensor 12 then prepares for transmission of the training signal ST in this training period.

Next, in a period from the timing t10 to a timing t11 (the training period P6) on the basis of an instruction from the processor 13C, the driver 21 of the image sensor 13 transmits the training signal ST having a high bit rate, and the receiver 32 of the application processor 18 receives this training signal ST, as illustrated in FIG. 7. The operation state of the bus system 2 in this period is similar to the operation state (FIG. 9D) in the training period P5.

In the receiver 32 of the application processor 18, the equalizer 50 operates in the operation mode M2 on the basis of an instruction from the communication controller 18C, and adjusts the gain C1 to C3 to widen the eye opening of the output signal of the amplifier 52 while equalizing the training signal ST having a high bit rate. Thereafter, the equalizer 50 stores the adjusted gains C1 to C3 as gains $C1_4$ to $C3_4$ (the coefficient set SET4) in the storage unit 42.

Next, the driver 22 of the application processor 18 transmits the signal SLP in a period from the timing t11 to a timing t12 (a reset period P11) on the basis of an instruction from the communication controller 18C, as illustrated in FIGS. 7 and 8. Thereafter, the receivers 31 of the display unit 11 and the image sensors 12 and 13 receive the signal SLP. The operation state of the bus system 2 in this period is similar to the operation state (FIG. 9A) in the reset period P1. The processor 11C of the display unit 11 and the processors 12C and 13C of the image sensors 12 and 13 then prepare for an instruction from the application processor 18 in a subsequent period (an instruction period P12).

Next, in a period from the timing t12 to a timing t13 (the instruction period P12), on the basis of an instruction from the communication controller 18C, the driver 22 of the application processor 18 transmits the data signal SD including the control data, and the receivers 31 of the display unit 11 and the image sensors 12 and 13 receive this data signal SD, as illustrated in FIG. 8. The operation state of the bus system in this period is similar to the operation state (FIG. 9B) in the instruction period P2.

In this example, the application processor 18 instructs the image sensor 12 to transmit the imaging data at a high bit rate in a first data communication period (a data communication period P13). Moreover, the application processor 18 instructs the image sensor 13 to transmit the imaging data at a high bit rate in a subsequent data communication period (a data communication period P14). Further, the application processor 18 instructs the display unit 11 to receive the image data in a subsequent data communication period (a data communication period P15). The processor 11C of the display unit 11 and the processors 12C and 13C of the image sensors 12 and 13 thereafter perform communication in accordance with this instruction.

Next, the driver 22 of the application processor 18 transmits the signal SLP in a period from the timing t13 to a timing t14 on the basis of an instruction from the communication controller 18C, as illustrated in FIG. 8. At this time, the driver 22 transmits the signal SLP in a period shorter than the reset periods P1 and P11. The operation state of the bus system 2 in this period is similar to the operation state in the reset periods P1 and P11 (FIG. 9A). The processor 11C of the display unit 11 and the processors 12C and 13C of the image sensors 12 and 13 grasp start of a subsequent new data communication period (the data communication period P13) on the basis of this signal SLP. The image sensor 12 then prepares for transmission of the imaging data in this data communication period.

Next, the driver 21 of the image sensor 12 transmits the data signal SD including the imaging data at a high hit rate in a period from the timing t14 to a timing t15 (the data communication period P13) on the basis of an instruction from the processor 12C, as illustrated in FIG. 8. Thereafter, the receiver 32 of the application processor 18 receives this data signal SD. The operation state of the bus system 2 in this period is similar to the operation state (FIG. 9C) in the training periods P3 and P4.

In the receiver 32 of the application processor 18, the equalizer 50 operates in the operation mode M1 on the basis of an instruction from the communication controller 18C, and first sets the gains C1 to C3 of the amplifiers 56 to 58 on the basis of the gains $C1_2$ to $C3_2$ included in the coefficient set SET2 that is stored in the storage unit 42. Thereafter, the equalizer 50 performs equalization while keeping the gains C1 to C3 of the amplifiers 56 to 58 constant. The application processor 18 thus receives the imaging data from the image sensor 12.

Next, the driver 22 of the application processor 18 transmits the signal SLP in a period from the timing t15 to a timing t16 on the basis of an instruction from the communication controller 18C, as illustrated in FIG. 8. At this time, the driver 22 transmits the signal SLP in a period shorter than the rest periods P1 and P11. The operation state of the bus system 2 in this period is similar to the operation state (FIG. 9A) in the reset periods P1 and P11. The processor 11C of the display unit 11 and the processors 12C and 13C of the image sensors 12 and 13 grasp start of a subsequent new data communication period (the data communication period P14) on the basis of this signal SLP. The processor 13C of the image sensor 13 then prepares for transmission of the imaging data in this data communication period.

Next, the driver 21 of the image sensor 13 transmits the data signal DS including the imaging data at a high bit rate in a period from the timing t16 to a timing t17 (the data communication period P14) on the basis of an instruction from the processor 13C, as illustrated in FIG. 8. Thereafter, the receiver 32 of the application processor 18 receives this data signal SD. The operation state of the bus system 2 in this period is similar to the operation state (FIG. 9D) in the training periods P5 and P6.

In the receiver 32 of the application processor 18, the equalizer 50 operates in the operation mode M1 on the basis of an instruction from the communication controller 18C, and first sets the gains C1 to C3 of the amplifier 56 to 58 on the basis of the gains $C1_4$ to $C3_4$ included the coefficient set SET4 that is stored in the storage unit 42. Thereafter, the equalizer 50 performs equalization while keeping the gains C1 to C3 of the amplifiers 56 to 58 constant. The application processor 18 thus receives the imaging data from the image sensor 12.

Next, the driver 22 of the application processor 18 transmits the signal SLP in a period from the timing t17 to a timing t18 on the basis of an instruction from the communication controller 18C, as illustrated in FIG. 8. At this time, the driver 22 transmits the signal SLP in a period shorter than the reset periods P1 and P11. The operation state of the bus system 2 in this period is similar to the operation state (FIG. 9A) in the reset periods P1 and P11. The processor 11C of the display unit 11 and the processors 12C and 13C of the image sensors 12 and 13 grasp start of a subsequent new data communication period (the data communication period P15) on the basis of this signal SLP. The processor 11C of the display unit 11 then prepares for reception of the image data in the data communication period.

Next, the driver 22 of the application processor 18 transmits the data signal SD including the image data in a period from the timing t18 to a timing t19 (the data communication period P15) on the basis of an instruction from the communication controller 18C, as illustrated in FIG. 8.

In this data communication period P15, the driver 22 of the application processor 18 transmits the data signal SD, and the receiver 31 of the display unit 11 receives this data signal SD, as illustrated in FIG. 9E. At this time, in the receiver unit 11R coupled to the one end of the bus 100, the amplitude value of the signal at the input terminal is equal to or smaller than the predetermined value Vth, which enables the termination resistor (the resistor 36). Moreover, in the transceiver unit 13T coupled to the other end of the bus 100, the output enable signal EN is inactive and the amplitude value of the signal at the input-output terminal is equal to or smaller than the predetermined value Vth, which enables the termination resistor (the resistor 26). As described above, the transceiver unit 13T enables the termination resistor in spite of not transmitting and not receiving the data signal SD.

In the bus system 2, an operation similar to the operation in a period from the timing t11 to the timing t19 is repeated thereafter. The bus system 2 performs transmission and reception of the data in such a manner.

As described above, in the bus system 2, a plurality of devices (the display unit 11, the image sensors 12 and 13, and the application processor 18) are coupled to the bus 100, which makes it possible to reduce a wiring space, as compared with a case where devices are coupled to one another on a one-on-one basis.

Moreover, in the bus system 2, the termination resistor (the resistor 36) of the receiver unit 11R and the termination resistor (the resistor 26) of the transceiver unit 13T are enabled in a period in which the training signal ST and the data signal SD are transmitted, which makes it possible to enhance communication quality. In other words, the receiver unit 11R is coupled to the one end of the bus 100, and the transceiver unit 13T is coupled to the other end of the bus 100; therefore, enabling the respective termination resistors in the receiver unit 11R and the transceiver unit 13T makes it possible to reduce reflection in the bus 100. As a result, it is possible to enhance communication quality in the bus system 2.

Further, in the bus system 2, the termination resistor (the resistor 36) in the receiver unit 11R and the termination resistor (the resistor 26) in the transceiver unit 13T are disabled in a period in which the signal SLP is transmitted, which makes it possible to reduce electric power consumption. In other words, the frequency of the signal is low in such a period; therefore, an influence of refection on communication quality is small. Accordingly, disabling the respective termination resistors in the receiver unit 11R and the transceiver unit 13T in such a period makes it possible to reduce electric power consumption while maintaining communication quality.

Furthermore, in the bus system 2, the resistors 111P to 114P and 111N to 114N are provided between the bus 100 and the respective devices. Specifically, the resistors 111P and 111N are inserted between the bus 100 and the receiver unit 11R, the resistors 112P and 112N are inserted between the bus 100 and the transceiver unit 18T, the resistors 113P and 113N are inserted between the bus 100 and the transceiver unit 12T, and the resistors 114P and 114N are inserted between the bus 100 and the transceiver unit 13T. This makes it possible to enhance communication quality as described below.

FIGS. 10A and 10B each are an eye diagram of a differential signal at an input terminal of a certain receiver, where FIG. 10A illustrates an example (a comparative example) in a case where the resistors 111P to 114P and 111N to 114N are not provided, and FIG. 10B illustrates an example in a case where the resistors 111P to 114P and 111N to 114N are provided. In the case where the resistors 111P to 114P and 111N to 114N are not provided, the signal is reflected and the waveform thereof is largely disturbed, as illustrated in FIG. 10A. In contrast, inserting these resistors makes it possible to reduce reflection of signals, as illustrated in FIG. 10B. Further, for example, in a case where an equalizer is provided in the receiver, it is possible to open the eye as illustrated in FIG. 11, and to enhance communication quality. In the bus system 2, the resistors 111P to 114P and 111N to 114N are provided between the bus 100 and the respective devices in such a manner, which makes it possible to enhance communication quality.

In addition, in the bus system 2, the application processor 18 provides an instruction of the order of communication of the display unit 11 and the image sensors 12 and 13. This allows the respective devices to use the bus 100 in a time-division manner, thereby enhancing flexibility of communication in the bus system 2. Further, in the bus system 2, in addition to the imaging data and the image data, the control data for such an instruction is also transmitted and received through the bus 100, which makes it possible to reduce a wiring space, as compared with a case where a wiring is separately provided for the control data.

Furthermore, in the bus system 2, a length of the period in which the application processor 18 transmits the signal SLP is varied. Specifically, the length of the period (the reset periods P1 and P11) in which the application processor 18 transmits the signal SLP before each of the instruction periods P2 and P12 is made different from the length of the period in which the application processor 18 transmits the signal SLP before each of the training periods P3 to P6 and the length of the period in which the application processor 18 transmits the signal SLP before each of the data communication periods P13 to P15. This allows the display unit 11 and the image sensors 12 and 13 to grasp whether the data signal SD after reception of the signal SLP is control data and to grasp that the communicable device is to be changed. This makes it possible to control communication by a simple method in the bus system 2.

Moreover, in the bus system 2, the application processor 18 equalizes the data signal SD with use of the stored coefficient sets SET upon reception of the data signal SD including the imaging data that is transmitted from the image sensors 12 and 13. This makes it possible to enhance communication quality. In other words, in a case where the gains C1 and C3 are adjusted upon every reception of the data signal SD without storing the coefficient sets SET, it takes time to adjust the gains C1 to C3, which causes a possibility that it is not possible to properly equalize the data signal SD. In this case, communication quality declines. In contrast, in the bus system 2, the gains C1 to C3 are adjusted in advance with use of the training signal ST, and the adjusted gains C1 to C3 are stored. Accordingly, in the bus system 2, it is possible to use the stored gains C1 to C3 upon reception of the data signal SD, which makes it possible to enhance communication quality without performing training upon every reception of the data signal SD.

Further, in the bus system 2, the respective coefficient sets for reception of the data signals SD transmitted from two image sensors 12 and 13 are stored, which makes it possible to enhance communication quality. In other words, as illustrated in FIG. 2, the two image sensors 12 and 13 are disposed in the bus 100 at positions different from each other; therefore, in general, the gains C1 to C3 that are preferable to equalize the data signal SD transmitted from the image sensor 12 are different from the gains C1 to C3 that are preferable to equalize the data signal SD transmitted from the image sensor 13. In the bus system 2, the plurality of coefficient sets SET are stored, which makes it possible to set preferable gains C1 to C3 for the two image sensors 12 and 13, thereby enhancing communication quality.

Furthermore, in the bus system 2, coefficient sets for reception of two data signals SD having bit rates different from each other are stored, which makes it possible to enhance communication quality. In other words, in the image sensors 12 and 13, for example, it is possible to vary resolution of a captured image, and it is possible to vary the bit rate of the data signal SD including the imaging data accordingly. In this case, there is a possibility that the gains C1 to C3 that are preferable to equalize the data signal SD having a high bit rate are different from the gains C1 to C3 that are preferable to equalize the data signal SD having a low bit rate. In the bus system 2, the plurality of coefficient sets SET are stored, which makes it possible to set preferable gains C1 to C3 corresponding to each of the bit rate, thereby enhancing communication quality.

[Effects]

As described above, in the present embodiment, the plurality of devices are coupled to the bus, which makes it possible to reduce a wiring space.

In the present embodiment, the termination resistors of the respective devices coupled to the ends of the bus are enabled in the instruction period and the data communication period, which makes it possible to enhance communication quality.

In the present embodiment, the termination resistors of the respective devices coupled to the ends of the bus are disabled in the reset period, etc., which makes it possible to reduce electric power consumption.

In the present embodiment, the resistors are inserted between the bus and the respective devices, which makes it possible to enhance communication quality.

In the present embodiment, the length of the period in which the application processor transmits the signal SLP is varied, which makes it possible to control communication by a simple method.

In the present embodiment, the data signal is equalized with use of stored coefficient sets, which makes it possible to enhance communication quality without performing training upon every reception of the data signal.

In the present embodiment, respective coefficient sets for reception of data signals transmitted from a plurality of image sensors are stored, which makes it possible to enhance communication quality.

In the present embodiment, respective coefficient sets for reception of a plurality of data signals having bit rates different from one another are stored, which makes it possible to enhance communication quality.

Modification Example 1-1

In the foregoing embodiment, the display unit 11 is coupled to the one end of the bus 100, and the image sensor 13 is coupled to the other end of the bus 100; however, the devices may be optionally disposed without limitation thereto. An example of other disposition is described below.

FIG. 12 illustrates a configuration example of a bus system 2A according to the present modification example. In the bus system 2A, the application processor 18 is coupled to the one end of the bus 100, and the image sensor 13 is coupled to the other end of the bus 100.

The transmission path 100P is coupled to the positive input-output terminal of the transceiver unit 18T, the positive input terminal of the receiver unit 11R, the positive input-output terminal of the transceiver unit 12T, and the positive input-output terminal of the transceiver unit 13T, at respective positions different from one another in the transmission path 100P. The one end of the transmission path 100P is coupled to the positive input-output terminal of the transceiver unit 18T, and the other end thereof is coupled to the positive input-output terminal of the transceiver unit 13T. Likewise, the transmission path 100N is coupled to the negative input-output terminal of the transceiver unit 18T, the negative input terminal of the receiver unit 11R, the negative input-output terminal of the transceiver unit 12T, and the negative input-output terminal of the transceiver unit 13T, at respective positions different from one another in the transmission path 100N. The one end of the transmission path 100N is coupled to the negative input-output terminal of the transceiver unit 18T, and the other end thereof is coupled to the negative input-output terminal of the transceiver unit 13T.

The positive input-output terminal of the transceiver unit 18T is coupled to the one end of the transmission path 100P through the resistor 111P and the transmission path 121P, and the negative input-output terminal thereof is coupled to the one end of the transmission path 100N through the resistor 111N and the transmission path 121N. The positive input terminal of the receiver unit 11R is coupled to the transmission path 100P through the resistor 112P and the transmission path 122P, and the negative input terminal thereof is coupled to the transmission path 100N through the resistor 112N and the transmission path 122N.

The transceiver units 12T and 13T are similar to those in the bus system 2 (FIG. 2) according to the foregoing embodiment.

Since the transceiver unit 18T is coupled to the one end of the bus 100 in this example, the termination control signal Toff is set to inactive in the transceiver unit 18T. Accordingly, in the transceiver unit 18T, the termination resistor (the resistor 26) is enabled in the case where the output enable signal EN is inactive and the amplitude value of the signal at the input-output terminal is equal to or smaller than the predetermined value Vth, and the termination resistor (the resistor 26) is disabled in other cases.

In contrast, since the receiver unit 11R is not coupled to the one end or the other end of the bus 100 in this example, the termination control signal Toff is set to active in the receiver unit 11R. Accordingly, the termination resistor (the resistor 36) is forcibly disabled in the receiver unit 11R.

FIG. 13A illustrates an operation state of the bus system 2A in the reset periods P1 and P11. In the reset periods P1 and P11, the driver 22 of the application processor 18 transmits the signal SLP, and the receivers 31 of the display unit 11 and the image sensors 12 and 13 receive this signal SLP. At this time, in the transceiver unit 18T coupled to the one end of the bus 100, the output enable signal EN is active, which disables the termination resistor (the resistor 26). Moreover, in the transceiver unit 13T coupled to the other end of the bus 100, the amplitude value of the signal at the input-output terminal is larger than the predetermined value Vth, which disables the termination resistor (the resistor 26).

FIG. 13B illustrates an operation state of the bus system 2A in the instruction periods P2 and P12. In the instruction periods P2 and P22, the driver 22 of the application processor 18 transmits the data signal SD including the control data, and the receivers 31 of the display unit 11 and the image sensors 12 and 13 receive this data signal SD. At this time, in the transceiver unit 18T coupled to the one end of the bus 100, the output enable signal EN is active, which disables the termination resistor (the resistor 26). In other words, in the transceiver unit 18T, the output impedance of the driver 22 functions as an output termination resistor, which disables the termination resistor (the resistor 26). In contrast, in the transceiver unit 13T coupled to the other end of the bus 100, the output enable signal EN is inactive and the amplitude value of the signal at the input-output terminal is equal to or smaller than the predetermined value Vth, which enables the termination resistor (the resistor 26).

FIG. 13C illustrates an operation state of the bus system 2A in the training period P3 and the data communication period P13. In the training period P3, the driver 21 of the image sensor 12 transmits the training signal ST, and the receiver 32 of the application processor 18 receives this training signal ST. Moreover, in the data communication period P13, the driver 21 of the image sensor 12 transmits the data signal SD including the imaging data, and the receiver 32 of the application processor 18 receives this data signal SD. At this time, in the transceiver unit 18T coupled to the one end of the bus 100, the output enable signal EN is inactive, and the amplitude value of the signal at the input-output terminal is equal to or smaller than the predetermined value Vth, which enables the termination resistor (the resistor 26). Further, in the transceiver unit 13T coupled to the other end of the bus 100, the output enable signal EN is inactive, and the amplitude value of the signal at the input-output terminal is equal to or smaller than the predetermined value Vth, which enables the termination resistor (the resistor 26). As described above, the transceiver unit 13T enables the termination resistor in spite of not transmitting and not receiving the signal.

As described above, the bus system 2A also makes it possible to achieve effects similar to the effects of the bus system 2 according to the foregoing embodiment. In other words, the present technology makes it possible to flexibly deal with a case where the disposition of the devices is changed to change the bus structure.

Modification Example 1-2

In the foregoing embodiment, the resistors 111P to 114P and 111N to 114N are provided between the bus 100 and the respective devices, as illustrated in FIG. 2; however, there is no limitation thereto. For example, as with a bus system 2B illustrated in FIG. 14, some of the resistors may be removed within a range in which communication quality satisfies specifications. In this example, the resistors 111P and 111N between the bus 100 and the receiver unit 11R are removed from the bus system 2 (FIG. 2). In other words, since the receiver unit 11R is coupled to the one end of the bus 100, the termination resistor (the resistor 36) is enabled in the instruction periods P2 and P12 (FIG. 9B), the training periods P3 to P6, and the data communication periods P13 to P15 (FIGS. 9C to 9E). As a result, reflection of signals is suppressed. Therefore, the resistors 111P and 111N may be removed within a range in which communication quality satisfies specifications.

Modification Example 1-3

In the foregoing embodiment, one bus 100 is provided; however, there is not limitation thereto. For example, as with a smartphone IC illustrated in FIG. 15, a clock bus 200 that transmits a clock signal may be further provided in addition to the bus 100. The smartphone IC includes a display unit 111, image sensors 112 and 113, and an application processor 118. Each of these devices is coupled to the bus 100 and the clock bus 200.

Modification Example 1-4

In the foregoing embodiment, in addition to the imaging data and the image data, the control data for instruction of the order of such communication is also transmitted and received through the bus 100; however, there is not limitation thereto. For example, the control data may be transmitted and received through another wiring.

Modification Example 1-5

In the foregoing embodiment, the application processor 18 transmits the signal SLP; however, there is no limitation thereto. For example, one of the image sensors 12 and 13 may transmit the signal SLP. Alternatively, two or more of the application processor 18 and the image sensors 12 and 13 may transmit the signal SLP.

Modification Example 1-6

In the foregoing embodiment, two image sensors 12 and 13 are provided; however, there is no limitation thereto. Alternatively, for example, three or more image sensors may be provided. Alternatively, one image sensor may be provided. In this case, the application processor 18 may store coefficient sets for reception of two data signals SD having bit rates different from each other that are transmitted from the one image sensor.

Modification Example 1-7

In the foregoing embodiment, the application processor 18 includes the equalizer 50; however, there is no limitation thereto. For example, an equalizer may be further provided in the display unit 11, or an equalizer may be provided in each of the two image sensors 12 and 13.

Modification Example 1-8

In the foregoing embodiment, the training signal ST has an alternate pattern ("1010 . . . "); however, the pattern is not limited thereto. Alternatively, for example, the training signal ST may have, for example, a pseudo-random pattern. Moreover, patterns of the training signals ST transmitted from the two image sensors 12 and 13 may be different from each other. Specifically, the image sensor 13 located far from the application processor 18 may transmit the training signal ST having a pseudo-random pattern, and the image sensor 12 located near the application processor 18 may transmit the training signal ST having an alternate pattern. Moreover, for example, in a case where the image sensors 12 and 13 transmit the training signal ST having a high bit rate, the image sensors 12 and 13 may transmit the training signal ST having a pseudo-random pattern, and in a case where the image sensors 12 and 13 transmit the training signal ST having a low bit rate, the image sensors 12 and 13 may transmit the training signal having an alternate pattern.

Modification Example 1-9

In the foregoing embodiment, the image sensors 12 and 13 are configured so that bit rates of the data signal SD and the training signal ST to be transmitted are variable; however, there is not limitation thereto. The image sensors 12 and 13 may be configured so that amplitudes of the data signal SD and the training signal ST to be transmitted are variable in place of or together with the bit rates. Specifically, the image sensor 13 located far from the application processor 18 may transmit the data signal SD and the training signal ST that have a large amplitude, and the image sensor 12 located near the application processor 18 may transmit the data signal SD and the training signal ST that have a small amplitude. In this case, the application processor 18 is allowed to store coefficient sets for reception of a plurality of data signals SD having amplitudes different from one another.

Other Modification Example

Moreover, two or more of these modification examples may be combined.

2. Second Embodiment

Next, description is given of a smartphone 3 including a bus system according to a second embodiment. In the present embodiment, the coefficient set SET is allowed to be updated. It is to be noted that components substantially same as those of the smartphone 1 according to the foregoing first embodiment are denoted by the same reference numerals, and description of such components is appropriately omitted.

The smartphone 3 includes an application processor 68, as illustrated in FIG. 1. The bus 100 configures a bus system 4 together with the display unit 11, the image sensors 12 and 13, and the application processor 68. The application processor 68 includes a transceiver unit 68T and a communication controller 68C, as illustrated in FIG. 2.

The transceiver unit 68T includes a receiver 62, as illustrated in FIG. 4.

FIG. 16 illustrates a configuration example of the receiver 62. The receiver 62 includes an equalizer 60. The equalizer 60 includes a controller 69. The controller 69 controls an operation of the equalizer 60 on the basis of the control signal EQ, as with the controller 59 according to the first embodiment. Moreover, the controller 69 monitors the eye opening of the output signal of the amplifier 52 in the operation mode M1, and also has a function of supplying the control signal CTL to the communication controller 68C in a case where the eye opening becomes smaller than a predetermined opening to inform the communication controller 68A of such a case.

The communication controller 68C controls an operation of the bus system 4, as with the communication controller 18C according to the first embodiment. Moreover, the communication controller 68C also has a function of controlling the operation of the bus system 4 to update the gains C1 to C3 (the coefficient set SET) on the basis of the control signal CTL supplied from the equalizer 60.

FIG. 17 illustrates a waveform diagram of signals in the bus 100. In this example, the controller 69 of the equalizer 60 determines that the eye opening of the output signal of the amplifier 52 becomes smaller than the predetermined opening, for example, upon reception of the data signal SD having a high bit rate transmitted from the image sensor 13. The communication controller 68C that has received such notification from the controller 69 performs the following operation, for example, in a blanking period in a case where the image sensor 13 performs an imaging operation.

First, the transceiver unit 68T of the application processor 68 transmits the signal SLP in a period from a timing t21 to a timing t22 (a reset period P21) on the basis of an instruction from the communication controller 68C.

Next, the driver 22 of the application processor 68 transmits the data signal SD including the control data in a period from the timing t22 to a timing t23 (an instruction period P22) on the basis of an instruction from the communication controller 68C. Thereafter, the receivers 31 of the display unit 11 and the image sensors 12 and 13 receive this data signal SD. Accordingly, the application processor 68 instructs the image sensor 13 to transmit the training signal ST having a high bit rate in a first training period (a training period P23).

Next, the driver 22 of the application processor 18 transmits the signal SLP in a period from the timing t23 to a timing t24 on the basis of an instruction from the communication controller 68C. At this time, the driver 22 transmits the signal SLP in a period shorter than the reset period P1. The processor 11C of the display unit 11 and the processors 12C and 13C of the image sensors 12 and 13 grasp start of a subsequent new training period (the training period P23) on the basis of this signal SLP. The processor 13C of the image sensor 13 then prepares for transmission of the training signal ST in this training period.

Next, the driver 21 of the image sensor 13 transmits the training signal ST having a high bit rate in a period from the timing t24 to a timing t25 (the training period P23) on the basis of an instruction from the processor 13C, and the receiver 62 of the application processor 68 receives this training signal ST.

In the receiver 62 of the application processor 68, on the basis of an instruction from the communication controller 68C, the equalizer 60 first sets the gains C1 to C3 of the amplifiers 56 to 58 on the basis of the gains $C1_4$ to $C3_4$ included in the coefficient set SET4 that are stored in the storage unit 42. Thereafter, the equalizer 60 operates in the operation mode M2, and adjusts the gains C1 to C3 to widen the eye opening of the output signal of the amplifier 52 while equalizing the training signal ST having a high bit rate. The equalizer 60 then stores the adjusted gains C1 to C3 as the gains $C1_4$ to $C3_4$ (the coefficient set SET4) in the storage unit 42.

Thereafter, the bus system 4 performs data communication as with the case in the first embodiment (FIG. 8).

As described above, in the bus system 4, the coefficient set SET is allowed to be updated. Accordingly, it is possible to update the coefficient set SET, for example, in a case where an environment such as temperature and a power source voltage varies to narrow the eye opening of the output signal of the amplifier 52. This makes it possible to enhance communication quality. In particular, in the bus system 4, the gains C1 to C3 are updated using, as initial values, the gains C1 to C3 included in the coefficient set SET that is stored in the storage unit 42, which makes it possible to update the gains C1 to C3 to more preferable gains in a short time.

As described above, in the present embodiment, the coefficient set is allowed to be updated, which makes it possible to enhance communication quality.

Modification Example 2-1

In the foregoing embodiment, the operation of updating the coefficient set is performed in the case where the eye opening of the output signal of the amplifier 52 becomes small; however, there is no limitation thereto. Alternatively, for example, a temperature sensor may be provided in each of the image sensors 12 and 13 and the application processor 68, and the operation of updating the coefficient set may be performed in a case where the temperature is varied by a predetermined amount or more. Moreover, for example, the operation of updating the coefficient set may be regularly performed at predetermined time intervals (for example, at time intervals of several seconds).

Modification Example 2-2

In the foregoing embodiment, the training period and the data communication period are separated with the signal SLP; however, there is no limitation thereto. Alternatively, for example, a training period may be provided immediately before the data communication period, as illustrated in FIG. 18. In this example, the application processor 68 transmits the data signal SD including the image data to the display unit 11 in a period from a timing t34 to a timing t35 (a data communication period P33). Thereafter, in a period from a timing t36 to a dining t37 (a training period P34), the image sensor 12 transmits the training signal ST to the application processor 68. At this time, the equalizer 60 of the application processor 68 updates the coefficient set SET2. Thereafter, the image sensor 12 transmits the data signal SD including the imaging data to the application processor 68 in a subsequent period from the timing t37 to a timing t38 (a data communication period P35). Moreover, the image sensor 13 transmits the training signal ST to the application processor 68 in a period from a timing t39 to a timing t40 (a training period P36). At this time, the equalizer 60 of the application processor 68 updates the coefficient set SET4. Thereafter, the image sensor 13 transmits the data signal SD including the imaging data to the application processor 68 in a subsequent period from the timing t40 to a timing t41 (a data communication period P37).

3. Application Example

Next, description is given of an application example of the bus system according to any of the foregoing embodiments and modification examples.

FIG. 19 illustrates an appearance of a smartphone to which the bus system according to any of the foregoing embodiments, etc. is applied. The smartphone includes, for example, a display unit 320 and a main body 310. The smartphone includes the bus system according to any of the foregoing embodiments, etc.

The bus system according to any of the foregoing embodiments, etc. is applicable to electronic apparatuses in every fields including a digital camera, a video camera, and various types of wearable digital cameras such as an eyeglass type and a watch type, in addition to such a smartphone. In other words, the bus system according to any of the foregoing embodiments, etc. is applicable to electronic apparatuses having a function of imaging an object, in every field.

Although the present technology has been described above by referring to some embodiments, modification examples, and application examples to electronic apparatuses, the present technology is not limited thereto, and may be modified in a variety of ways.

For example, the two image sensors are coupled to the bus in each of the foregoing embodiments; however, there is no limitation thereto. Alternatively, for example, one image sensor may be coupled to the bus, or three or more image sensors may be coupled to the bus.

Moreover, for example, the two transmission paths 100P and 100N are used to configure the bus 100; however, there is no limitation thereto. For example, one transmission path may be used to configure the bus, or three or more transmission paths may be used to configure the bus.

Further, for example, the display unit is coupled to the bus in each of the foregoing embodiments; however, there is no limitation thereto, and the display unit may not be coupled to the bus.

It is to be noted that the effects described in the present specification are illustrative and non-limiting, and other effects may be included.

It is to be noted that the present technology may have the following configurations.

(1)

A bus system, including:

three or more devices that include one or a plurality of imaging devices, and transmit and receive a data signal in a time-division manner; and a bus to which the three or more devices are coupled and through which the data signal is transmitted, in which a first device of the three or more devices includes:

an equalizer having a first operation mode in which a received signal is equalized with use of a coefficient set including one or a plurality of equalization coefficients, a storage unit that stores a plurality of the coefficient sets, and a communication controller that selects one of the plurality of the coefficient sets stored in the storage unit and causes the equalizer to operate in the first operation mode with use of the selected coefficient set.

(2)

The bus system according to (1), in which the equalizer has a second operation mode in which a received signal is equalized while adjusting the one or plurality of equalization coefficients, and the communication controller instructs a second device of the three or more devices to transmit a first pattern signal having a first data pattern, and causes the equalizer to operate in the second operation mode and stores, in the storage unit, a first coefficient set including the one or plurality of adjusted equalization coefficients.

(3)

The bus system according to (2), in which the communication controller instructs the second device to transmit the data signal, and selects the first coefficient set from the plurality of the coefficient sets stored in the storage unit and causes the equalizer to operate in the first operation with use of the first coefficient set.

(4)

The bus system according to (2) or (3), in which the communication controller instructs a third device of the three or more devices to transmit a second pattern signal having a second data pattern, and causes the equalizer to operate in the second operation mode and stores, in the storage unit, a second coefficient set including the one or plurality of adjusted equalization coefficients.

(5)

The bus system according to (4), in which the first data pattern is equal to the second data pattern.

(6)

The bus system according to (4), in which the first data pattern is different from the second data pattern.

(7)

The bus system according to (1), in which the equalizer has a second operation mode in which a received signal is equalized while adjusting the one or plurality of equalization coefficients, a second device of the three or more devices has a plurality of transmission modes including a first transmission mode and a second transmission mode, and the communication controller instructs the second device to transmit a first pattern signal having a first data pattern in the first transmission mode, and causes the equalizer to operate in the second operation mode and stores, in the storage unit, a first coefficient set including the one or plurality of adjusted equalization coefficient.

(8)

The bus system according to (7), in which the communication controller instructs the second device to transmit the data signal in the first transmission mode, and selects the first coefficient set from the plurality of the coefficient sets stored in the storage unit and causes the equalizer to operate in the first operation mode with use of the first coefficient set.

(9)

The bus system according to (7) or (8), in which the communication controller instructs the second device to transmit a second pattern signal having a second data pattern in the second transmission mode, and causes the equalizer to operate in the second operation mode and stores, in the storage unit, a second coefficient set including the one or plurality of adjusted equalization coefficient.

(10)

The bus system according to any one of (7) to (9), in which a bit rate in the first transmission mode is different from a bit rate in the second transmission mode.

(11)

The bus system according to (10), in which the second device is an imaging device, the data signal includes imaging data, the second device transmits the data signal in the first transmission mode and the second transmission mode, and resolution of the imaging data included in the data signal transmitted in the first transmission mode is different from resolution of the imaging data included in the data signal transmitted in the second transmission mode.

(12)

The bus system according to any one of (7) to (11), in which a signal amplitude in the first transmission mode is different from a signal amplitude in the second transmission mode.

(13)

The bus system according to any one of (2) to (12), in which the communication controller instructs the second device to transmit the first pattern signal after storing the first coefficient set, and causes the equalizer to operate in the second operation mode with use of the one or plurality of equalization coefficients of the first coefficient set as initial values to update the first coefficient set.

(14)

The bus system according to (13), in which the communication controller instructs the second device to transmit the first pattern signal immediately before transmission of the data signal to update the first coefficient set.

(15)

The bus system according to (13), in which
the second device is an imaging device,
the data signal includes imaging data, and
the communication controller instructs the second device to transmit the first pattern signal within a blanking period to update the first coefficient set.

(16)

The bus system according to any one of (13) to (15), in which the communication controller determines a timing of updating the first coefficient set on the basis of the data signal equalized by the equalizer.

(17)

The bus system according to any one of (13) to (16), in which the communication controller determines a timing of updating the first coefficient set on the basis of one or both of a device temperature of the first device and a device temperature of the second device.

(18)

The bus system according to any one of (2) to (17), in which the communication controller instructs the second device to transmit the first pattern signal through the bus.

(19)

The bus system according to any one of (1) to (18), in which a device coupled to one end of the bus, among the three or more devices, includes a termination resistor that is settable to be enabled or disabled.

(20)

A communication device, including:
an equalizer having a first operation mode in which a received signal is equalized with use of a coefficient set including one or a plurality of equalization coefficients;
a storage unit that stores a plurality of the coefficient sets; and
a communication controller that selects one of the plurality of the coefficient sets stored in the storage unit and causes the equalizer to operate in the first operation mode with use of the selected coefficient set.

(21)

The communication device according to (20), in which
the equalizer has a second operation mode in which a received signal is equalized while adjusting the one or plurality of equalization coefficients, and
the communication controller instructs a communication partner to transmit a pattern signal having a predetermined data pattern, and causes the equalizer to operate in the second operation mode and stores, in the storage unit, a first coefficient set including the one or plurality of adjusted equalization coefficients.

(22)

The communication device according to (21), in which the communication controller instructs the communication partner to transmit the data signal, and selects the first coefficient set from the plurality of the coefficient sets stored in the storage unit and causes the equalizer to operate in the first operation mode with use of the first coefficient set.

(23)

The communication device according to (21) or (22), in which the communication controller instructs the communication partner to transmit the pattern signal after storing the first coefficient set and causes the equalizer to operate in the second operation mode with use of the one or plurality of equalization coefficients of the first coefficient set as initial values to update the first coefficient set.

This application claims the benefit of Japanese Priority Patent Application JP2015-201459 filed on Oct. 9, 2015, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A bus system, comprising:
three or more devices that include one or a plurality of imaging devices, and transmit and receive a data signal in a time-division manner; and
a bus to which the three or more devices are coupled and through which the data signal is transmitted, wherein
a first device of the three or more devices includes:
an equalizer having a first operation mode in which a received signal is equalized with use of a coefficient set including one or a plurality of equalization coefficients,
a storage unit that stores a plurality of the coefficient sets, and
a communication controller that selects one of the plurality of the coefficient sets stored in the storage unit and causes the equalizer to operate in the first operation mode with use of the selected coefficient set,
the equalizer has a second operation mode in which the received signal is equalized while adjusting the one or plurality of equalization coefficients,
a second device of the three or more devices has a plurality of transmission modes including a first transmission mode and a second transmission mode,
the communication controller instructs the second device to transmit a first pattern signal having a first data pattern in the first transmission mode, and causes the equalizer to operate in the second operation mode and stores, in the storage unit, a first coefficient set including the one or plurality of adjusted equalization coefficients,
the communication controller instructs the second device to transmit the data signal in the first transmission mode, and selects the first coefficient set from the plurality of the coefficient sets stored in the storage unit and causes the equalizer to operate in the first operation mode with use of the first coefficient set, and
the communication controller instructs the second device to transmit a second pattern signal having a second data pattern in the second transmission mode, and causes the equalizer to operate in the second operation mode and stores, in the storage unit, a second coefficient set including the one or plurality of adjusted equalization coefficients.

2. The bus system according to claim 1, wherein the communication controller instructs a third device of the three or more devices to transmit third pattern signal having the second data pattern, and causes the equalizer to operate in the second operation mode and stores, in the storage unit, the coefficient set including the one or plurality of adjusted equalization coefficients.

3. The bus system according to claim 2, wherein the first data pattern is equal to the second data pattern.

4. The bus system according to claim 2, wherein the first data pattern is different from the second data pattern.

5. The bus system according to claim 1, wherein a bit rate in the first transmission mode is different from a bit rate in the second transmission mode.

6. The bus system according to claim 5, wherein
the second device is an imaging device,
the data signal includes imaging data,
the second device transmits the data signal in the first transmission mode and the second transmission mode, and
resolution of the imaging data included in the data signal transmitted in the first transmission mode is different from resolution of the imaging data included in the data signal transmitted in the second transmission mode.

7. The bus system according to claim 1, wherein a signal amplitude in the first transmission mode is different from a signal amplitude in the second transmission mode.

8. The bus system according to claim 1, wherein the communication controller instructs the second device to transmit the first pattern signal after storing the first coefficient set, and causes the equalizer to operate in the second operation mode with use of the one or plurality of equalization coefficients of the first coefficient set as initial values to update the first coefficient set.

9. The bus system according to claim 8, wherein the communication controller instructs the second device to transmit the first pattern signal immediately before transmission of the data signal to update the first coefficient set.

10. The bus system according to claim 8, wherein
the second device is an imaging device,
the data signal includes imaging data, and
the communication controller instructs the second device to transmit the first pattern signal within a blanking period to update the first coefficient set.

11. The bus system according to claim 8, wherein the communication controller determines a timing of updating the first coefficient set on a basis of the data signal equalized by the equalizer.

12. The bus system according to claim 8, wherein the communication controller determines a timing of updating the first coefficient set on a basis of one or both of a device temperature of the first device and a device temperature of the second device.

13. The bus system according to claim 1, wherein the communication controller instructs the second device to transmit the first pattern signal through the bus.

14. The bus system according to claim 1, wherein a device coupled to one end of the bus, among the three or more devices, includes a termination resistor that is settable to be enabled or disabled.

15. A communication device, comprising:
an equalizer having a first operation mode in which a received signal is equalized with use of a coefficient set including one or a plurality of equalization coefficients;
a storage unit that stores a plurality of the coefficient sets; and
a communication controller that selects one of the plurality of the coefficient sets stored in the storage unit and causes the equalizer to operate in the first operation mode with use of the selected coefficient set, wherein
the equalizer has a second operation mode in which the received signal is equalized while adjusting the one or plurality of equalization coefficients,
a communication partner has a plurality of transmission modes including a first transmission mode and a second transmission mode,
the communication controller instructs the communication partner to transmit a first pattern signal having a predetermined first data pattern in the first transmission mode, and causes the equalizer to operate in the second operation mode and stores, in the storage unit, a first coefficient set including the one or plurality of adjusted equalization coefficients,
the communication controller instructs the communication partner to transmit a data signal in the first transmission mode, and selects the first coefficient set from the plurality of the coefficient sets stored in the storage unit and causes the equalizer to operate in the first operation mode with use of the first coefficient set, and
the communication controller instructs the second device to transmit a second pattern signal having a second data pattern in the second transmission mode, and causes the equalizer to operate in the second operation mode and stores, in the storage unit, a second coefficient set including the one or plurality of adjusted equalization coefficients.

16. The communication device according to claim 15, wherein the communication controller instructs the communication partner to transmit the first pattern signal after storing the first coefficient set and causes the equalizer to operate in the second operation mode with use of the one or plurality of equalization coefficients of the first coefficient set as initial values to update the first coefficient set.

* * * * *